United States Patent
Yagishita et al.

(10) Patent No.: US 7,492,951 B2
(45) Date of Patent: Feb. 17, 2009

(54) IMAGE PROCESSING METHOD AND APPARATUS, AND COMPUTER-READABLE STORAGE MEDIUM

(75) Inventors: Takahiro Yagishita, Kanagawa (JP); Yukio Kadowaki, Nara (JP); Yasushi Abe, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 741 days.

(21) Appl. No.: 10/713,477

(22) Filed: Nov. 14, 2003

(65) Prior Publication Data

US 2004/0131265 A1 Jul. 8, 2004

(30) Foreign Application Priority Data

Nov. 15, 2002 (JP) .............................. 2002-332070

(51) Int. Cl.
*G06K 9/36* (2006.01)
*G06K 9/46* (2006.01)

(52) U.S. Cl. ...................................................... 382/232
(58) Field of Classification Search ................ 382/233, 382/239

See application file for complete search history.

(56) References Cited

U.S. PATENT DOCUMENTS

| | | | | |
|---|---|---|---|---|
| 5,905,812 A | * | 5/1999 | Kim | 382/236 |
| 5,991,458 A | * | 11/1999 | Kunitake et al. | 382/254 |
| 6,061,475 A | * | 5/2000 | Blair | 382/239 |
| 6,937,767 B1 | * | 8/2005 | Burak et al. | 382/232 |
| 7,076,103 B2 | * | 7/2006 | Yamada | 382/232 |
| 2002/0025076 A1 | * | 2/2002 | Yamada | 382/233 |
| 2002/0076043 A1 | * | 6/2002 | Van Der Vleuten et al. | 380/37 |
| 2004/0001635 A1 | * | 1/2004 | Van Der Schaar | 382/233 |
| 2004/0114817 A1 | * | 6/2004 | Jayant et al. | 382/239 |

OTHER PUBLICATIONS

Charilaos Chistopoulos, Athanassios Skodras, Touradj Ebrahimi ; The JPEG2000 Still Image Coding System: An Overview, Aug. 30, 2003 ; IEEE, Ericsson Research Corporate Unit, Electronics Laboratory University of Patras, Signal Processing Laboratory EPFL.*
Sachin Deshpande and Wenjun Zeng, Sharp Laboratories of America ; HTTP Streaming of JPEG2000 Images, 2001 IEEE.*
ISO/IEC 15444-1 ; Dec. 15, 2000 ; Information technology—JPEG 2000 image coding system—Part:2: Core coding system, In particular look at Annex A and I.*
ISO/IEC 15444-1 ; Dec. 7, 2000 ; Coding of Still Pictures ; In particular look at file format, header, and metadata information.*

* cited by examiner

*Primary Examiner*—Brian Q Le
*Assistant Examiner*—Nathan Bloom
(74) *Attorney, Agent, or Firm*—Blakely, Sokoloff, Taylor & Zafman LLP

(57) ABSTRACT

An image processing apparatus is provided with an image expansion unit to expand an image compressed code and to output an expanded image data, the image compressed code is obtained by compressing a master image data, and a picture quality judging unit to judge a relative picture quality of the expanded image data with respect to a picture quality of the master image data, based on the image compressed code, and to generate picture quality information indicating the relative picture quality.

27 Claims, 19 Drawing Sheets

FIG.3
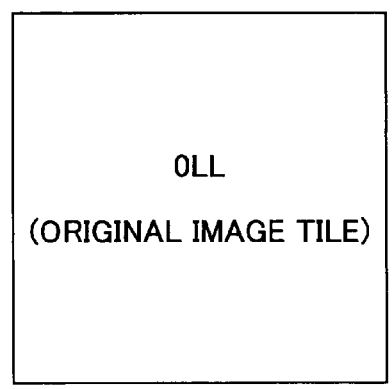
DECOMPOSITION_LEVEL_0
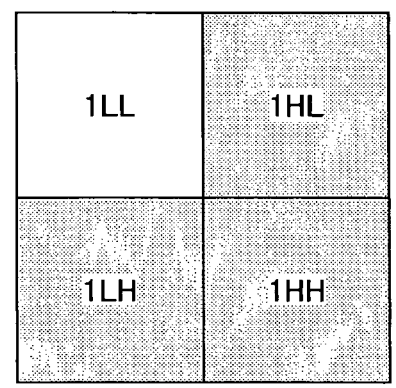
DECOMPOSITION_LEVEL_1
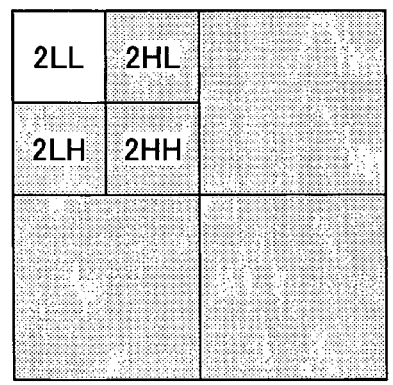
DECOMPOSITION_LEVEL_2
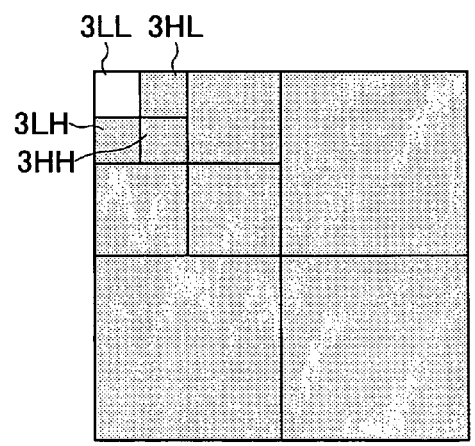
DECOMPOSITION_LEVEL_3

FIG.16
MASTER IMAGE
BIT PLANE
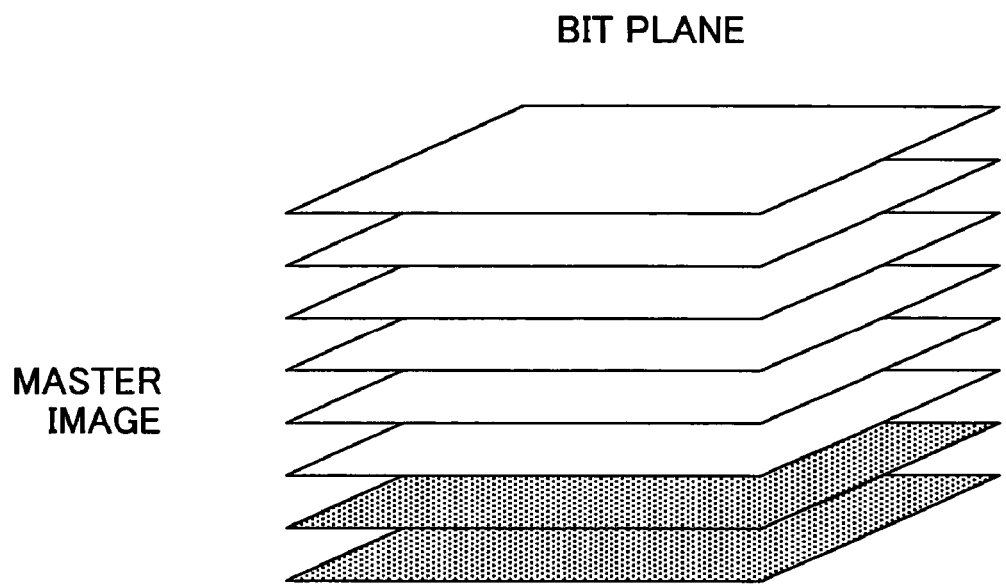
DISTRIBUTED IMAGE
BIT PLANE
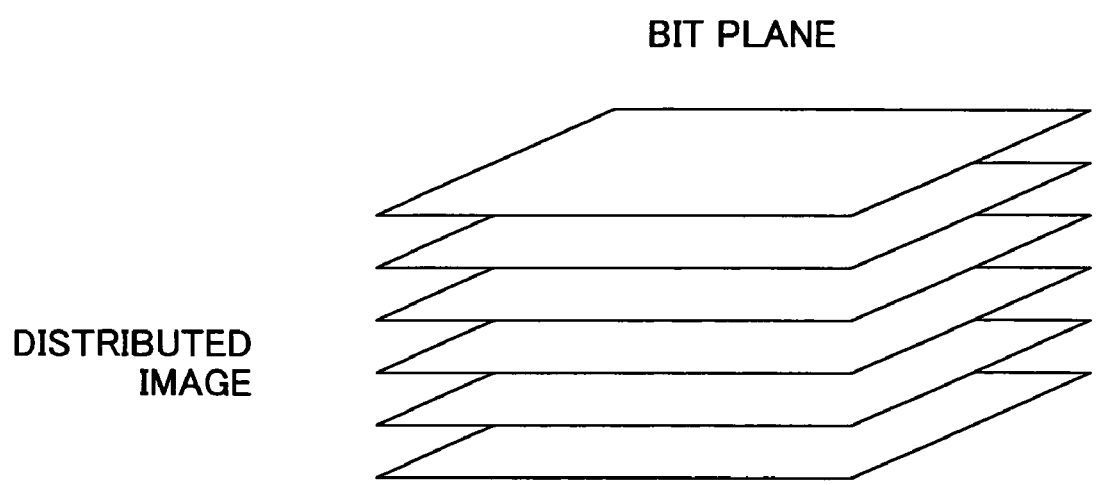

FIG.17
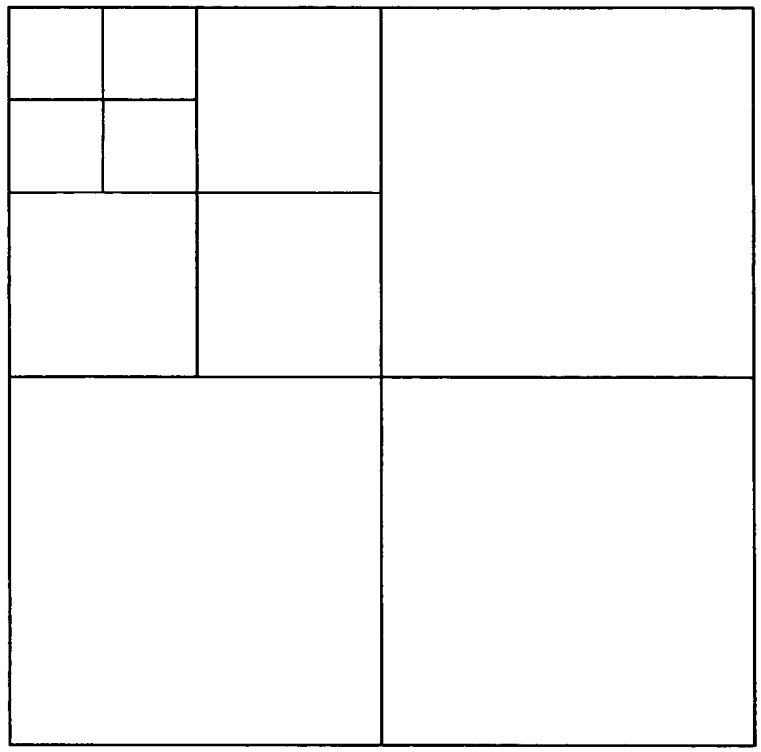
MASTER IMAGE
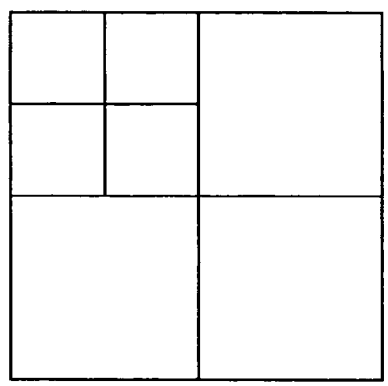
DISTRIBUTED IMAGE

FIG.18
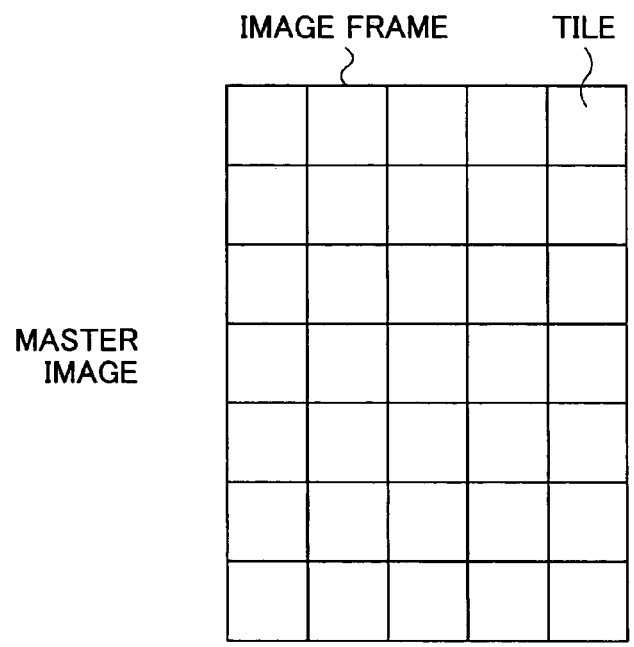
MASTER IMAGE
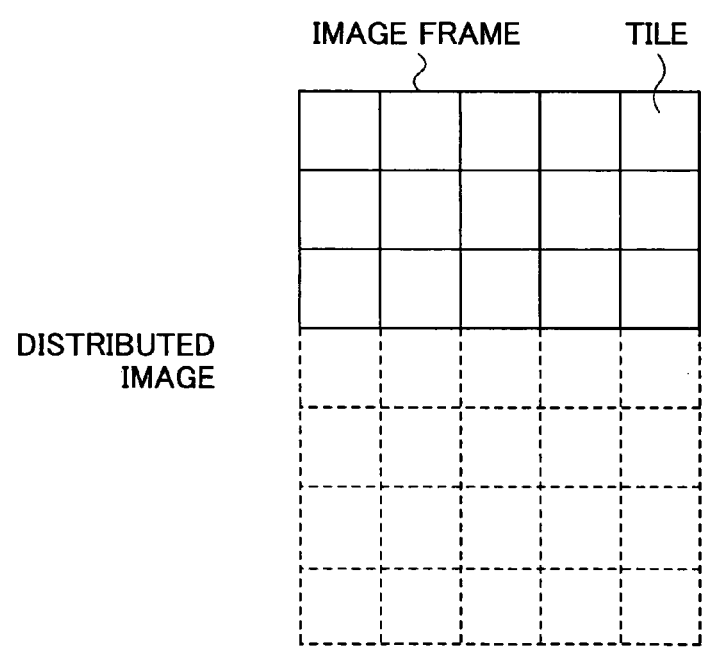
DISTRIBUTED IMAGE

IMAGE PROCESSING METHOD AND APPARATUS, AND COMPUTER-READABLE STORAGE MEDIUM

This application claims the benefit of a Japanese Patent Application No. 2002-332070 filed Nov. 15, 2002, in the Japanese Patent Office, the disclosure of which is hereby incorporated by reference.

BACKGROUND OF THE INVENTION

1. Field of the Invention

The present invention generally relates to image processing methods, image processing apparatuses and storage media, and more particularly to an image processing method and an image processing apparatus which expand image compressed codes, and to a computer-readable storage medium which stores a computer program for causing a computer to expand image compressed codes.

2. Description of the Related Art

Due to progresses made in image input techniques and image output techniques, demands for high-definition images have increased considerably in recent years. For example, in the case of digital cameras that are used as image input apparatuses, there are high-performance digital cameras even in the popular price range, because the cost of high-performance charge coupled devices (CCDs) having over 3,000,000 pixels has decreased. CCDs having over 5,000,000 pixels will probably be realized in the near future. It is anticipated that such a trend, that is, the tendency of the number of pixels of the CCDs to increase, will continue.

On the other hand, there are demands to realize the high-definition and the low cost also in the field of hard copy apparatuses and soft copy apparatuses. The hard copy apparatuses include image output apparatuses such as laser printers, ink-jet printers, thermal printers and the like. The soft copy apparatuses include flat-panel display apparatuses such as cathode ray tubes (CRTs), liquid crystal displays (LCDs), plasma display panels (PDPs) and the like.

Processing of high-definition images has become popular due to the development of such high-performance and low-cost image input apparatuses and image output apparatuses, and it is expected that the demand for high-definition images will further increase in the future. Actually, the development of network-related technologies including personal computers and the Internet is in effect accelerating such trends. Recently, mobile (or portable) equipments such as portable telephone sets and portable personal computers have become particularly popular, and high-definition images are frequently transmitted from and received at various locations using a communication means.

As a result, it is expected that the demands to improve image compression and expansion techniques will increase further so as to facilitate processing of the high-definition images.

As one image compression technique that satisfies such demands, a technique called JPEG2000, has been proposed and is being standardized. The JPEG2000 enables restoration of high-quality images even at a high compression ratio. The JPEG2000 divides the image into rectangular regions called tiles, and carries out the compression and expansion process in units of tiles, so that the processes may be carried out using a relatively small memory capacity. In other words, the compression and expansion process can be carried out independently in units of tiles.

One frame of the JPEG2000 image may be displayed consecutively at a predetermined frame rate, so as to display a dynamic image. The frame rate refers to a number of frames that is reproduced per unit time. An international standard called Motion JPEG2000 has been proposed which displays the dynamic image by successively displaying the JPEG2000 images.

However, the JPEG2000 and the Motion JPEG2000 are not yet complete, and various problems have yet to be solved before actually reducing such standards into practice.

For example, when irreversibly compressing a master image data by the JPEG2000 or the Motion JPEG2000 and distributing the compressed image data, a receiving end, which receives the compressed image data, is unable to know a relative picture quality of an image that is obtained by expanding the compressed image data with respect to the master image.

If picture quality information were distributed in addition to the compressed image data, it would be possible to know the relative picture quality of the expanded image with respect to the master image. However, it would be necessary in this case to set a new transmission and reception protocol to enable the exchange of the picture quality information between the distributing source and the receiving end (distributing destination), and there is a problem in that the protocol will become complex.

Furthermore, if a relative picture quality difference of the expanded image with respect to the master image is small, there was a problem in that it is difficult to subjectively see the picture quality difference.

SUMMARY OF THE INVENTION

An image processing method and apparatus, and computer-readable storage medium is disclosed. In one embodiment, the image processing apparatus comprises an image expansion unit to expand an image compressed code and to output an expanded image data. The image compressed code is obtained by compressing a master image data. The image processing apparatus further comprises an image display unit to display an image of the expanded image data on a display unit, a picture quality judging unit to judge a relative picture quality of the expanded image data with respect to a picture quality of the master image data, based on the image compressed code, and to output picture quality information indicating the relative picture quality, and an image information display unit to display the picture quality information on the display unit.

BRIEF DESCRIPTION OF THE DRAWINGS

FIG. 3 is a diagram for illustrating sub-bands at each decomposition level when there are three decomposition levels;

FIG. 16 is a diagram for illustrating a method of obtaining a relative picture quality value of a distributed image with respect to a master image based on a number of bit planes;

FIG. 17 is a diagram for illustrating a method of obtaining the relative picture quality value of the distributed image with respect to the master image based on a resolution;

FIG. 18 is a diagram for illustrating a method of obtaining the relative picture quality value of the distributed image with respect to the master image based on a number of tiles;

DESCRIPTION OF THE PREFERRED EMBODIMENTS

Figure 1:
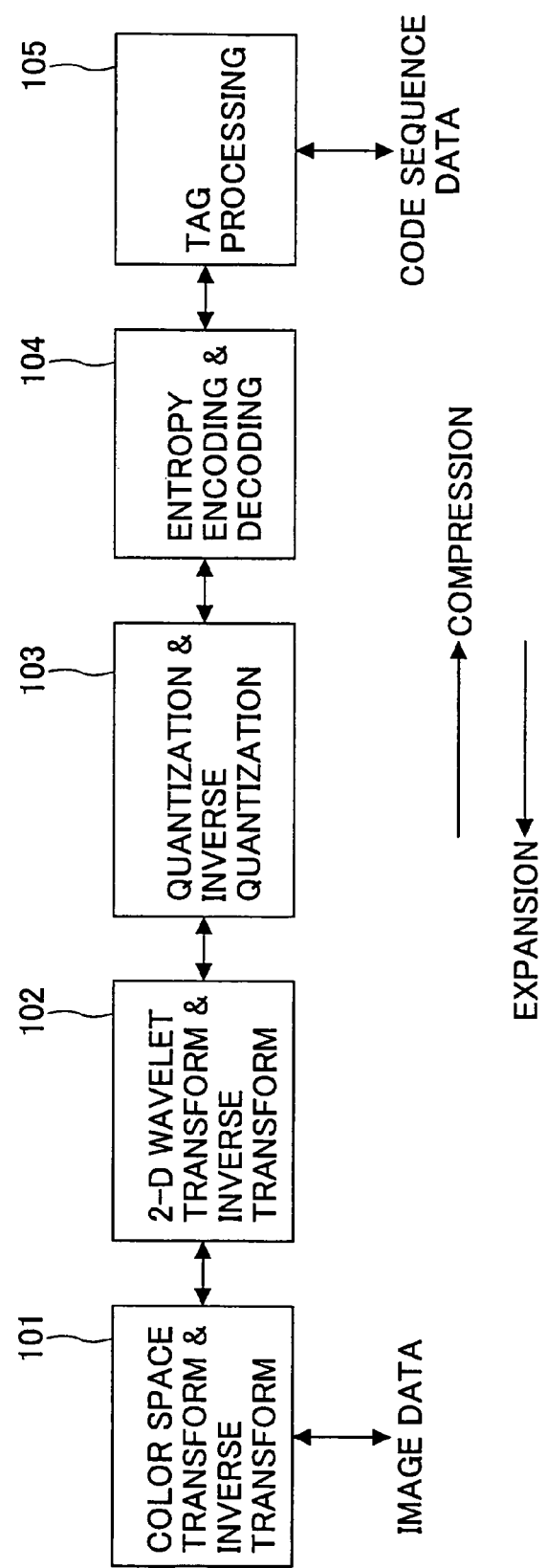
FIG. 1 is a functional block diagram showing a system for realizing the hierarchical encoding algorithm that forms a basis of the JPEG2000 which is used in the embodiments.

Accordingly, one embodiment of the present invention comprises a novel and useful image processing method, image processing apparatus and computer-readable storage medium, in which the problems described above are eliminated.

Another embodiment of the present invention comprises image processing method, an image processing apparatus and a computer-readable storage medium, which can easily and subjectively see a relative picture quality of an expanded image with respect to a master image.

Still another embodiment of the present invention comprises an image processing apparatus having an image expansion unit to expand an image compressed code and to output an expanded image data. The image compressed code is obtained by compressing a master image data. The image processing apparatus further comprises an image display unit to display an image of the expanded image data on a display unit; a picture quality judging unit to judge a relative picture quality of the expanded image data with respect to a picture quality of the master image data, based on the image compressed code, and to output picture quality information indicating the relative picture quality; and an image information display unit to display the picture quality information on the display unit. According to one embodiment of the image processing apparatus of the present invention, it is possible to easily and subjectively see a relative picture quality of the expanded image with respect to the master image.

The picture quality judging unit may comprise a master code information acquiring unit to acquire code information of the master image data included in the image compressed code; a code information acquiring unit to acquire code information of the image compressed code; and a picture quality information output unit to output, as the picture quality information, a comparison result of the code information acquired by the master code information acquiring unit and the code information acquired by the code information acquiring unit. In this case, it is possible to obtain picture quality of the expanded image data as subjective picture quality information.

The picture quality judging unit may use a number of code bits of the master image data as the code information included in the image compressed code; the master code information acquiring unit may acquire the number of code bits of the master image data as the code information of the master image data; and the code information acquiring unit may acquire a number of code bits of the image compressed code as the code information of the image compressed code. In this case, it is possible to obtain picture quality information that indicates the picture quality of the expanded image data, solely from the image compressed code.

The image compressed code may be obtained by encoding frequency conversion coefficients of the master image data in units of bit planes; the picture quality judging unit may use a number of bit planes of the master image data as the code information included in the image compressed code; the master code information acquiring unit may acquire the number of bit planes of the master image data as the code information of the master image data; and the code information acquiring unit may acquire a number of bit planes of the image compressed code as the code information of the image compressed data. In this case, it is possible to obtain the picture quality information which indicates the picture quality of the expanded image data, solely from the image compressed code.

The image compressed code may be obtained by encoding multiple resolution conversion coefficients of the master image data in units of resolutions; the picture quality judging unit may use a resolution of the master image data as the code information included in the image compressed code; the master code information acquiring unit may acquire the resolution of the master image data as the code information of the master image data; and the code information acquiring unit may acquire a resolution of the image compressed code as the code information of the image compressed data. In this case, it is possible to obtain the picture quality information, which indicates the picture quality of the expanded image data, solely from the image compressed code.

The image compressed code may be obtained by dividing the master image data into a plurality of rectangular regions and encoding the master image data in units of rectangular regions; the picture quality judging unit may use a number of rectangular regions of the master image data as the code information included in the image compressed code; the master code information acquiring unit may acquire the number of rectangular regions of the master image data as the code information of the master image data; and the code information acquiring unit may acquire a number of rectangular regions of the image compressed code as the code information of the image compressed data. In this case, it is possible to obtain the picture quality information, which indicates the picture quality of the expanded image data, solely from the image compressed code.

The predetermined rectangular regions may have been subjected to a weighting, of the number of rectangular regions of the image compressed data acquired by the code information acquiring unit. By carrying out the weighting with respect to the predetermined rectangular regions, such as the Region Of Interest (ROI) having a picture quality that is improved relative to other portions of the image, it is possible to more accurately obtain the picture quality information that indicates the picture quality of the expanded image data.

The image compressed code may be obtained by encoding the master image data, formed by dynamic image data, in units of frames; the picture quality judging unit may use a number of frames of the master image data as the code information included in the image compressed code; the master code information acquiring unit may acquire the number of frames of the master image data as the code information of the master image data; and the code information acquiring unit may acquire a number of frames of the image compressed code as the code information of the image compressed data. In this case, it is possible to obtain the picture quality information that indicates the picture quality of the expanded image data, solely from the image compressed code.

Another embodiment of the present invention comprises a computer-readable storage medium that stores a computer program for causing a computer to process image data. The computer program comprises an image expansion procedure causing the computer to expand an image compressed code and to output an expanded image data, the image compressed code is obtained by compressing a master image data; an image display procedure causing the computer to display an image of the expanded image data on a display unit; a picture quality judging procedure causing the computer to judge a relative picture quality of the expanded image data with respect to a picture quality of the master image data, based on the image compressed code, and to output picture quality information indicating the relative picture quality; and an image information display procedure causing the computer to display the picture quality information on the display unit. According to the computer-readable storage medium of the present invention, it is possible to easily and subjectively see a relative picture quality of the expanded image with respect to the master image.

Another embodiment of the present invention is an image processing method comprising expanding an image compressed code and outputting an expanded image data, where the image compressed code is obtained by compressing a master image data; displaying an image of the expanded image data on a display unit; judging a relative picture quality of the expanded image data with respect to a picture quality of the master image data, based on the image compressed code, and outputting picture quality information indicating the relative picture quality; and displaying the picture quality information on the display unit. According to one embodiment of the image processing method of the present invention, it is possible to easily and subjectively see a relative picture quality of the expanded image with respect to the master image.

Still another embodiment of the present invention is an image processing apparatus comprising image expansion means for expanding an image compressed code and for outputting an expanded image data, the image compressed code is obtained by compressing a master image data; image display means for displaying an image of the expanded image data on a display unit; picture quality judging means for judging a relative picture quality of the expanded image data with respect to a picture quality of the master image data, based on the image compressed code, and for outputting picture quality information indicating the relative picture quality; and image information display means for displaying the picture quality information on the display unit. According to the image processing apparatus of the present invention, it is possible to easily and subjectively see a relative picture quality of the expanded image with respect to the master image.

A further embodiment of the present invention is an image processing apparatus comprising an image expansion unit to expand an image compressed code and to output an expanded image data, the image compressed code is obtained by compressing a master image data; and a picture quality judging unit to judge a relative picture quality of the expanded image data with respect to a picture quality of the master image data, based on the image compressed code, and to generate picture quality information indicating the relative picture quality. According to an embodiment of the image processing apparatus of the present invention, it is possible to easily and subjectively see a relative picture quality of the expanded image with respect to the master image.

In the image processing apparatus above, the image quality judging unit may generate the picture quality information based on a comparison of code information of the master image data included in the image compressed code and code information of the image compressed code, both the code information is selected from a group consisting of a number of code bits of image data, a number of bit planes of image data, a resolution of image data, a number of rectangular regions into which the master image data is divided upon encoding, and a number of frames of image data. In this case, it is possible to obtain the picture quality information that indicates the picture quality of the expanded image data, solely from the image compressed code.

Another embodiment of the present invention is a computer-readable storage medium that stores a computer program for causing a computer to process image data. The computer program comprises an image expansion procedure causing the computer to expand an image compressed code and to output an expanded image data, the image compressed code is obtained by compressing a master image data; and a picture quality judging procedure causing the computer to judge a relative picture quality of the expanded image data with respect to a picture quality of the master image data, based on the image compressed code, and to generate picture quality information indicating the relative picture quality. According to an embodiment, the computer-readable storage medium of the present invention, it is possible to easily and subjectively see a relative picture quality of the expanded image with respect to the master image.

Still another embodiment of the present invention is an image processing method comprising expanding an image compressed code and outputting an expanded image data, where the image compressed code is obtained by compressing a master image data; and judging a relative picture quality of the expanded image data with respect to a picture quality of the master image data, based on the image compressed code, and generating picture quality information indicating the relative picture quality. According to an embodiment of the image processing method of the present invention, it is possible to easily and subjectively see a relative picture quality of the expanded image with respect to the master image.

Other embodiments and further features of the present invention will be apparent from the following detailed description when read in conjunction with the accompanying drawings.

First, a general description will be given of the hierarchical encoding algorithm and the JPEG2000 algorithm that are used in the embodiments, which will be described hereunder, so as to facilitate the understanding of the present invention.

FIG. 1 is a functional block diagram showing a system for realizing the hierarchical encoding algorithm that forms a basis of the JPEG2000 that is used in the embodiments. The system shown in FIG. 1 includes a color space transform and inverse transform unit 101, a two-dimensional wavelet transform and inverse transform unit 102, a quantization and inverse quantization unit 103, an entropy encoding and decoding unit 104, and a tag processing unit 105.

The system shown in FIG. 1 greatly differs from the conventional JPEG algorithm on several points. One differing point of the system shown in FIG. 1, compared to the JPEG algorithm, is the transformation algorithm used. Although the JPEG algorithm uses the Discrete Cosine Transform (DCT), the hierarchical encoding algorithm uses the Discrete Wavelet Transform (DWT) in the two-dimensional wavelet transform and inverse transform unit 102. The DWT has an advantage over the DCT in that the picture quality in the high compression region is improved, and this is one of the reasons the DWT is used the JPEG2000 algorithm which is to succeed the JPEG algorithm.

Another differing point of the system shown in FIG. 1, compared to the JPEG, is the provision of the tag processing unit 105 at the final stage of the system to form the code. In the tag processing unit 105, compressed data is generated as code sequence data at the time of image compression, and code sequence data necessary for the expansion is analyzed at the time of the image expansion. The JPEG2000 can realize various convenient functions by use of the code sequence data. For example, it is possible to freely stop the compression and expansion operation with respect to the still image at an arbitrary hierarchical level (decomposition level) corresponding to an octave division of the block-based DWT, as will be described later with reference to FIG. 3.

The color space transform and inverse transform unit 101 is connected in most cases to the input and output unit with respect to the original image. For example, the RGB colorimetric system made up of each of the red (R), green (G) and blue (B) components of the primary color system or, the YMC colorimetric system made up of each of the yellow (Y), magenta (M) and cyan (C) components of the complementary color system, is subjected to the transform or inverse transform to the YUV colorimetric system or the YCbCr colorimetric system.

Figure 2:
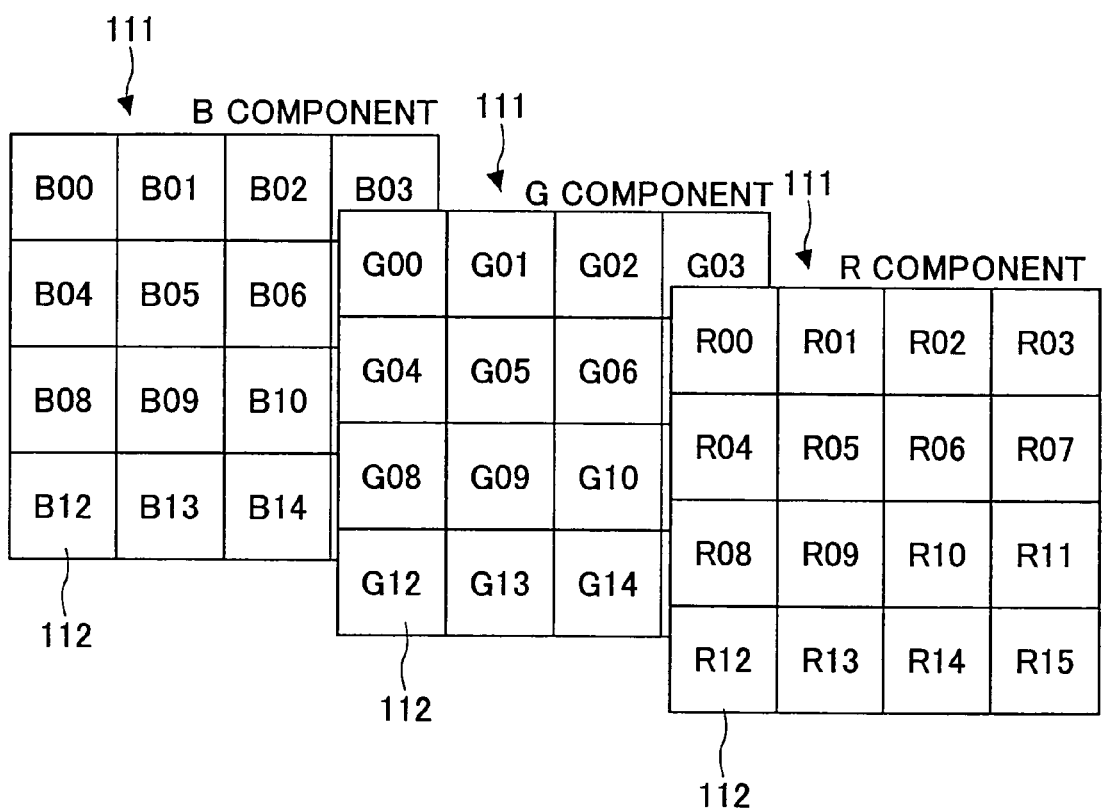
FIG. 2 is a diagram showing divided rectangular regions of each of color components of an original image.

Next, a description will be given of the JPEG2000 algorithm. FIG. 2 is a diagram showing divided rectangular regions of each of the color components of the original image. As shown in FIG. 2, each of the R, G and B components 111 (of the RGB primary color system) of the original image is divided into rectangular regions. Each rectangular region is generally referred to as a block or a tile. The rectangular region is generally referred to as the tile in the case of the JPEG2000, and thus, the rectangular region will hereinafter be referred to as the tile. In the particular case shown in FIG. 2, each component 111 is divided into four tiles 112 in the vertical direction and four tiles 112 in the horizontal direction, that is, a total of 16 (=4×4) tiles 112. The R component 111 is made up of tiles R00, R01, . . . , R15, the G component 111 is made up of tiles G00, G01, . . . , G15, and the B component 111 is made up of tiles B00, B01, . . . , B15. The tile forms the basic unit when carrying out the compression and expansion process with respect to the image data. Hence, the compression and expansion of the image data is carried out independently for each component 111 and for each tile 112.

When encoding the image data, the data of each tile 112 of each component 111 is input to the color space transform and inverse transform unit 101 shown in FIG. 1. After the data is subjected to the color space transform, a two-dimensional wavelet transform (forward transform) is carried out in the two-dimensional wavelet transform and inverse transform unit 102, so as to spatially divide the data into frequency bands.

FIG. 3 is a diagram for illustrating sub-bands at each decomposition level when there are three decomposition levels. With respect to a tile original image 0LL (decomposition level 0) obtained by dividing the original image into the tiles, the two-dimensional wavelet transform is carried out to separate sub-bands 1LL, 1HL, 1LH and 1HH indicated by a decomposition level 1. Then, with respect to a low-frequency component 1LL in this hierarchical level, the two-dimensional wavelet transform is carried out to separate sub-bands 2LL, 2HL, 2LH and 2HH indicated by a decomposition level 2. Similarly thereafter, the two-dimensional wavelet transform is carried out with respect to a low-frequency component 2LL to separate sub-bands 3LL, 3HL, 3LH and 3HH indicated by a decomposition level 3. In FIG. 3, the sub-bands, which are to be subjected to the encoding at each decomposition level, are indicated by halftone dot meshing. For example, if there are three decomposition levels, the sub-bands 3HL, 3LH, 3HH, 2HL, 2LH, 2HH, 1HL, 1HL and 1HH indicated by the halftone dot meshing are to be subjected to the encoding, and the sub-band 3LL is not encoded.

Next, target bits, which are to be subjected to the encoding, are determined in the order of the specified encoding, and a context is generated from neighboring bits of the target bits in the quantization and inverse quantization unit 103 shown in FIG. 1.

Figure 4:
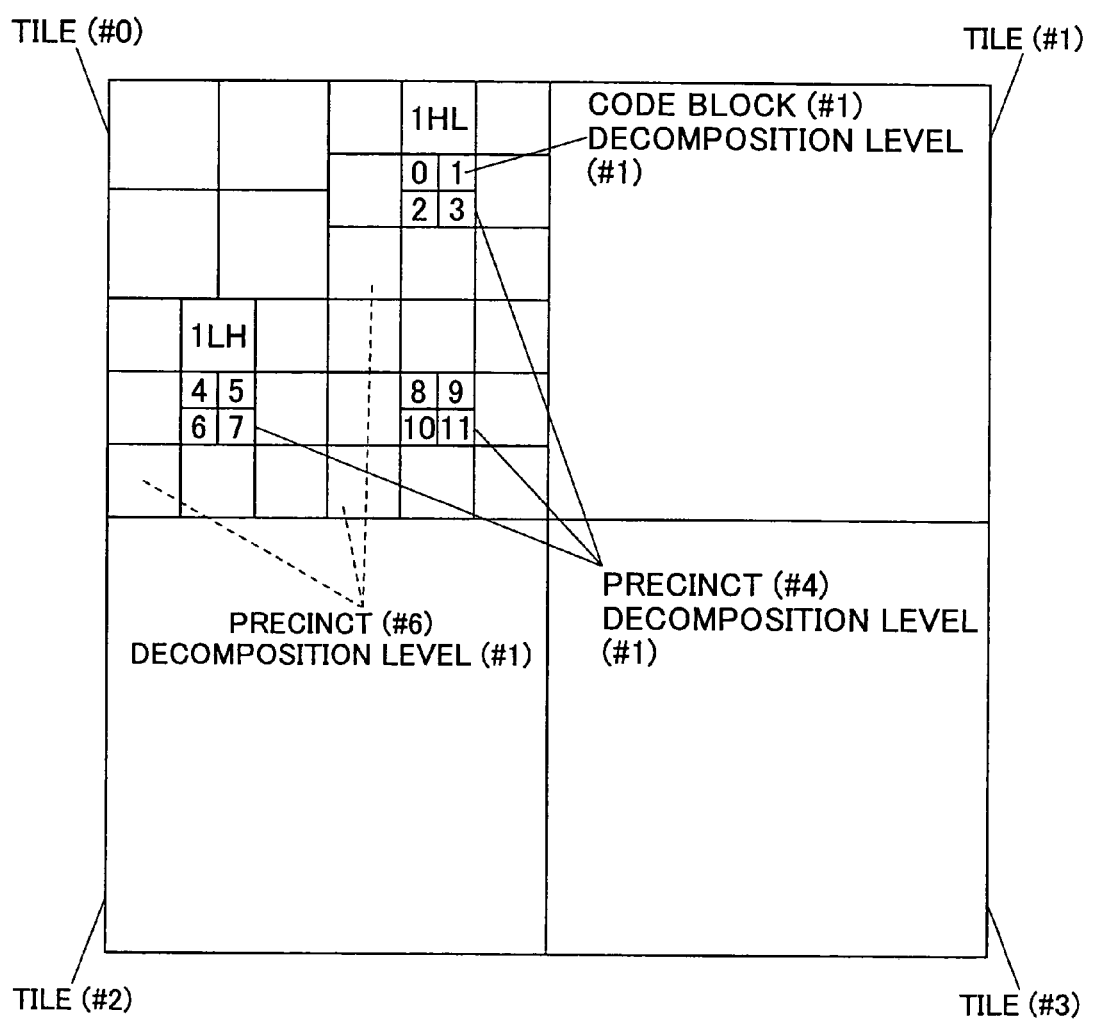
FIG. 4 is a diagram showing a precinct.

The wavelet coefficients after the quantization process ends are divided into non-overlapping rectangles called "precinct" for each of the sub-bands. The precinct is introduced to effectively utilize the memory upon implementation. FIG. 4 is a diagram showing the precinct. As shown in FIG. 4, one precinct is made up of three spatially matching rectangular regions. Furthermore, each precinct is divided into "code blocks" of non-overlapping rectangles. The code block becomes a basic unit of entropy encoding.

The coefficient values after the wavelet transform may be quantized and encoded as they are. But in the case of the JPEG2000, the coefficient values are decomposed into "bit plane" units in order to improve the encoding efficiency, and the "bit plane" may be ordered for every pixel or code block.

Figure 5:
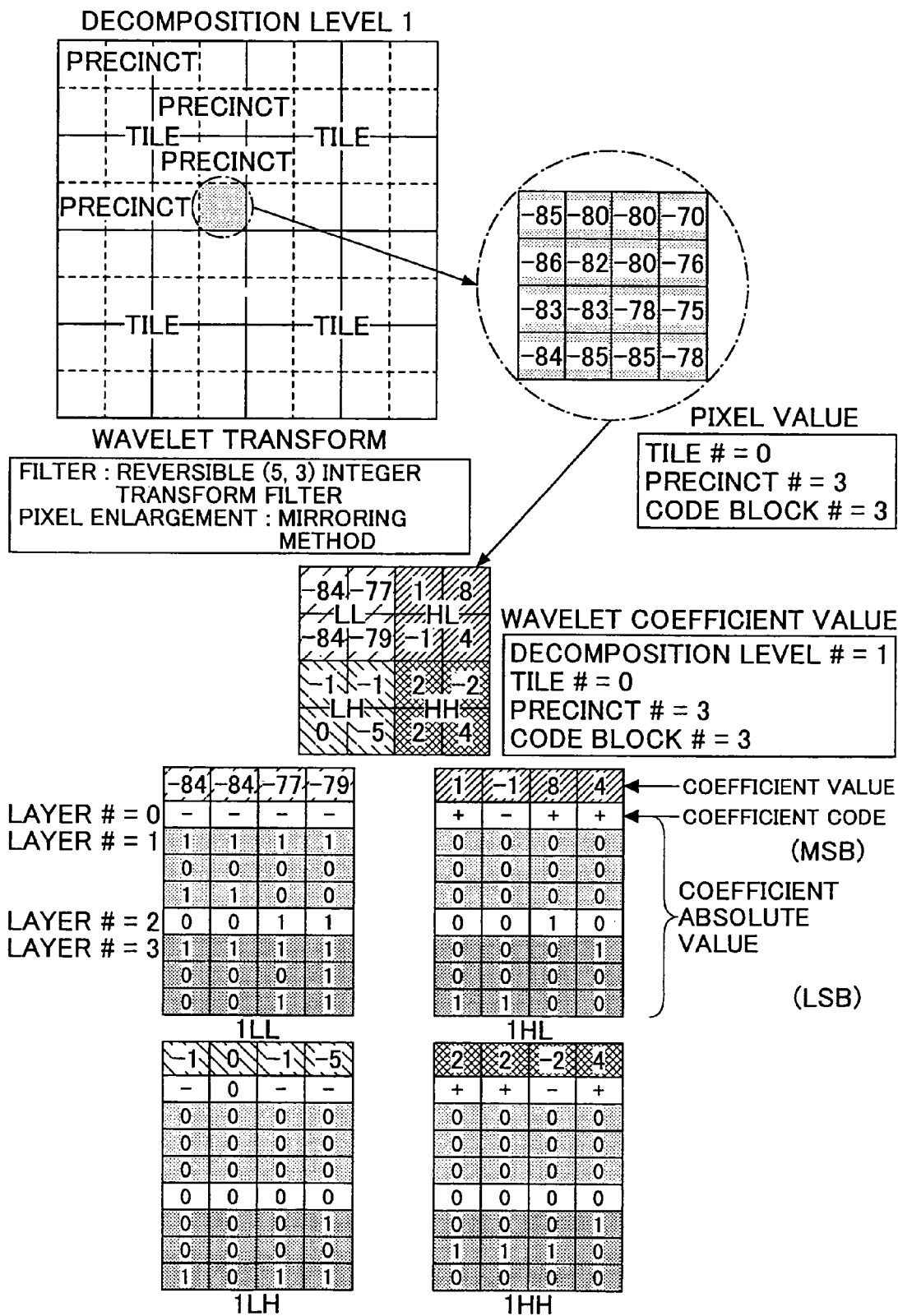
FIG. 5 is a diagram showing an ordering procedure with respect to a bit plane.

FIG. 5 is a diagram showing an ordering procedure with respect to the bit plane. FIG. 5 shows a case where the original image having 32×32 pixels is divided into four tiles each having 16×16 pixels, and the precinct and the code block of the decomposition level 1 respectively have sizes of 8×8 pixels and 4×4 pixels. The precinct and the code block are numbered in the raster sequence, and in this particular case, precinct numbers (#) 0 to 3 are allocated to the precincts, and code block numbers (#) 0 to 3 are allocated to the code blocks. A mirroring method is used for the pixel enlargement with respect to the outside of the tile boundary, and the wavelet transform is carried out by a reversible (5, 3) filter to obtain the wavelet coefficient values of the decomposition level 1.

In addition, FIG. 5 also shows the concept of a typical "layer" structure for the tile number (#) 0, the precinct number (#) 3 and the code block number (#) 3. The code block after the transform is divided into the sub-bands 1LL, 1HL, 1LH and 1HH, and the wavelet coefficient is allocated to each sub-band.

The layer structure is easier to understand when the wavelet coefficient values are viewed from the horizontal direction (bit plane direction). One layer is formed by an arbitrary number of bit planes. In this particular case, each of the layer numbers (#) 0, 1, 2 and 3 is made up of the bit plane numbers (#) 1, 3, 1 and 3. The layers including the bit plane closer to the least significant bit (LSB) are subjected to the quantization earlier, and the layers including the bit plane closer to the most significant bit (MSB) are subjected to the quantization later and remain unquantized until the end or remain unquantized to the end. The method that discards the layers closer to the LSB is called truncation, and is capable of finely controlling the quantization rate.

In the entropy encoding and decoding unit 104 shown in FIG. 1, the encoding with respect to the tiles 112 of each component 111 is carried out by probability estimation based on the context and the target bit. The encoding process is carried out in units of the tiles 112 for all of the components 111 of the original image. Finally, the tag processing unit 105 combines all of the encoded data from the entropy encoding and decoding unit 104 into one code sequence data, and adds a tag to the code sequence data.

Figure 6:
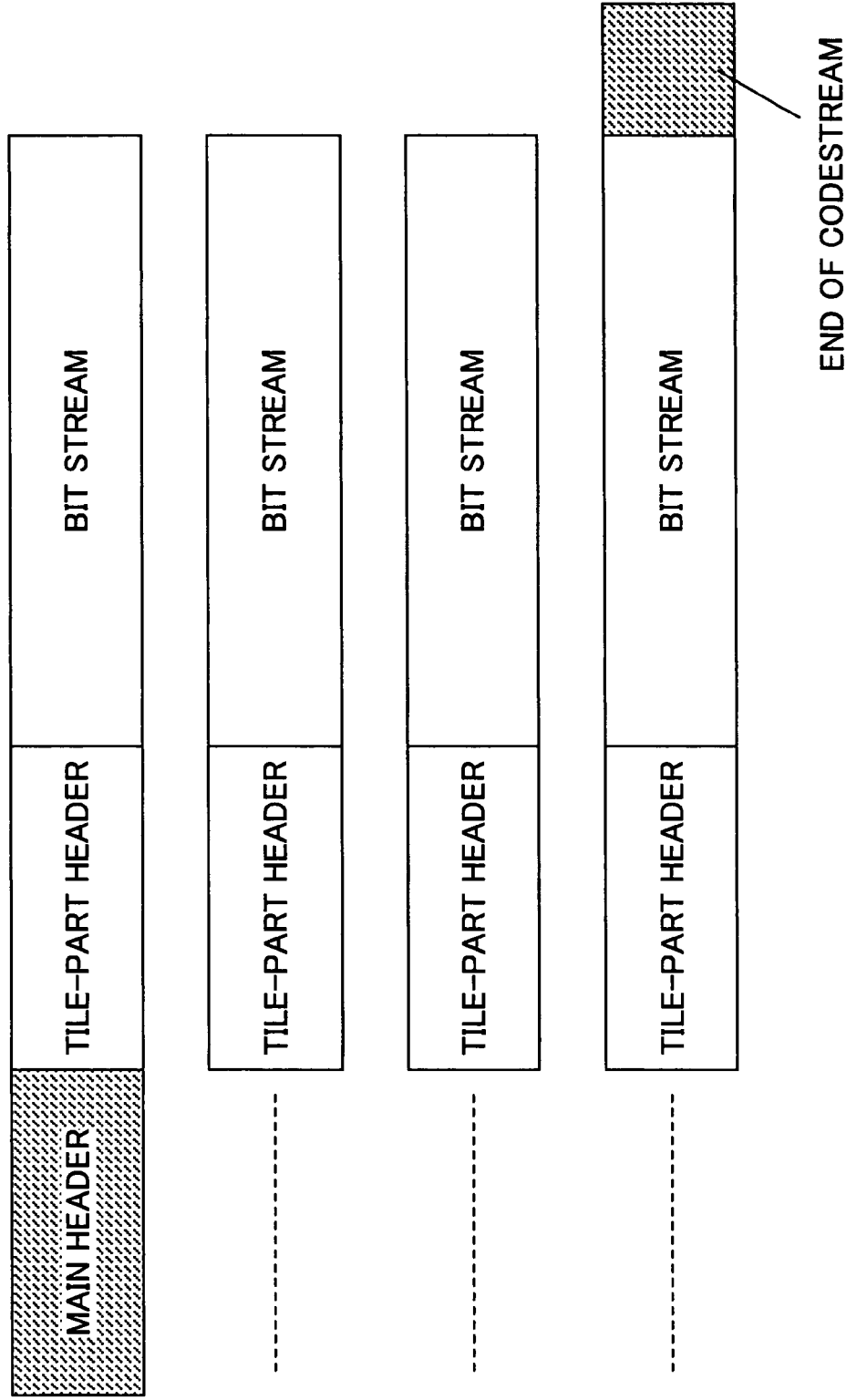
FIG. 6 is a diagram showing a general structure of one frame of code sequence data.

FIG. 6 is a diagram showing a general structure of one frame of the code sequence data. As shown in FIG. 6, tag information called a main header is added to the start of the code sequence data. Encoding parameters and quantization parameters are written in the main header. In addition, tag information called a tile-part header is added to the start of the code data (bit stream) of each tile. The tile-part header includes tile boundary position information, tile boundary direction information or the like. The encoded data of each tile follows each tile-part header. Tag information called an end of codestream is added to an end of the code sequence data.

On the other hand, when decoding the encoded data, the image data is generated from the code sequence data of each tile 112 of each component 111, in a manner in reverse to that at the time of encoding the image data. In this case, the tag processing unit 105 analyzes the tag information which is added to the code sequence data which is input from the outside, decomposes the code sequence data into the code sequence data of each tile 112 of each component 111, and carries out the decoding process (expansion process) for every code sequence data of each tile 112 of each component 111. In this state, the position of the bit to be subjected to the decoding is determined in the order based on the tag information within the code sequence data, and the quantization and inverse quantization unit 103 generates the context from the arrangement of the neighboring bits (decoding of which is already ended) to the target bit position. The entropy encoding and decoding unit 104 carries out the decoding by the probability estimation based on the context and the coded sequence data to generate the target bit, and the generated target bit is written at the position of the target bit. Since the decoded data is spatially divided for every frequency band, each tile of each component of the image data can be restored by subjecting the decoded data to the two-dimensional wavelet inverse transform in the two-dimensional wavelet transform and inverse transform unit 102. The restored data is transformed into the image data of the original colorimetric system by the color space transform and inverse transform unit 101.

Figure 7:
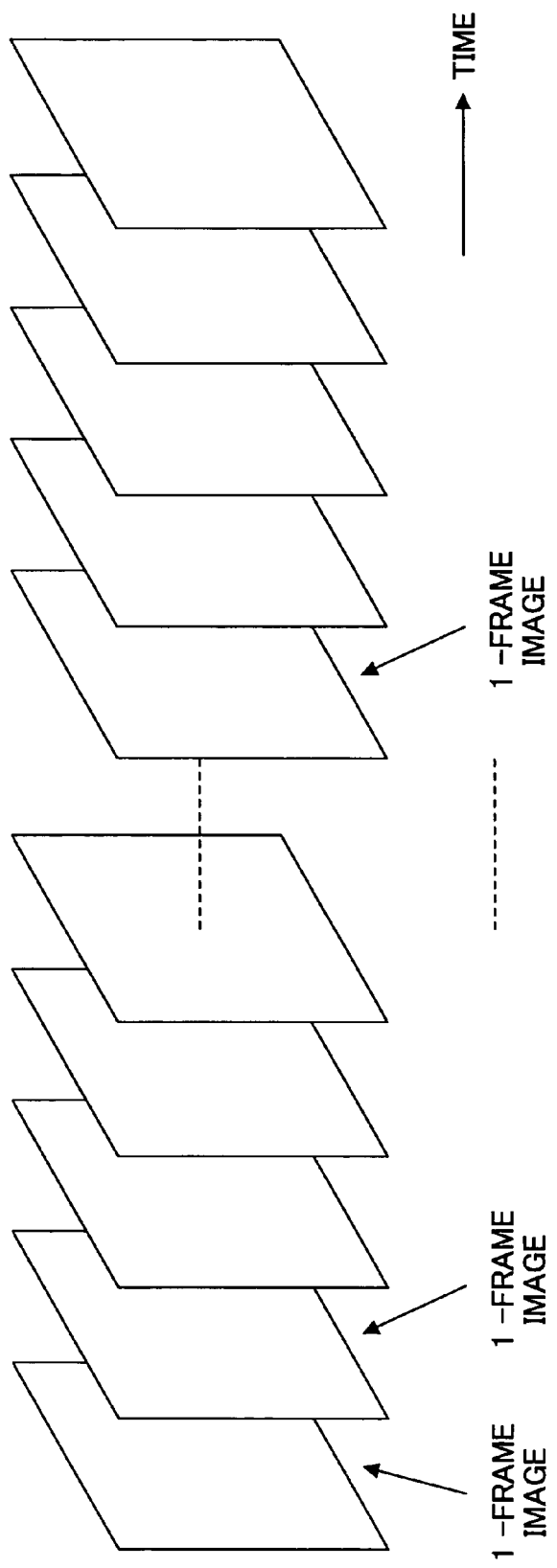
FIG. 7 is a diagram for illustrating the Motion JPEG2000 algorithm.

The JPEG2000 algorithm is as described above. The Motion JPEG2000 algorithm is an expansion of the system for the still image, that is, a single frame, to multiple frames. Hence, the Motion JPEG2000 algorithm displays a dynamic image by consecutively displaying one frame of the JPEG2000 image at a predetermined frame rate (number of frames reproduced per unit time), as shown in FIG. 7. FIG. 7 is a diagram for illustrating the Motion JPEG2000 algorithm.

Next, a description will be given of one embodiment of an image processing method according to the present invention. One embodiment of the image processing method employs an embodiment of an image processing apparatus according to the present invention and an embodiment of a computer-readable storage medium according to the present invention. It is assumed for the sake of convenience that this embodiment employs a dynamic image compression and expansion technique typified by the Motion JPEG2000. However, the present invention is of course applicable to image compression and expansion techniques other than that employed in this embodiment described hereunder.

Figure 8:
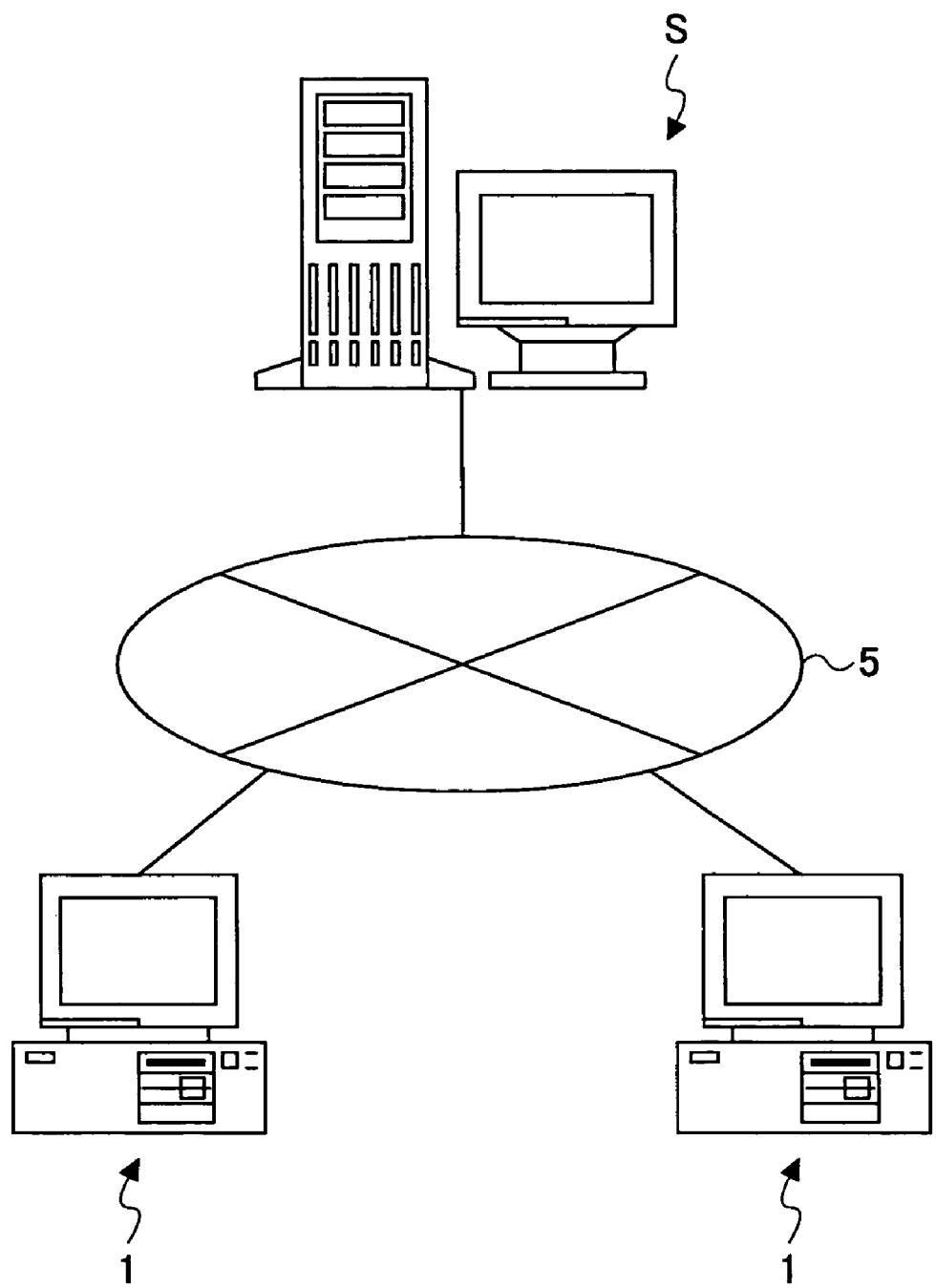
FIG. 8 is a diagram showing a structure of a system including image processing apparatuses.

FIG. 8 is a diagram showing a structure of a system including image processing apparatuses. In addition, FIG. 9 is a functional block diagram showing a structure of the image processing apparatus.

The system shown in FIG. 8 includes a server computer S and a plurality of image processing apparatuses 1 that are connected via a network 5 such as the Internet. The server S may have a known basic structure made up of a CPU and a memory unit. The network 5 may be made up of a cable network and/or a wireless network. Each image processing apparatus 1 is connectable via the network 5 to the server computer S that stores various dynamic image data. One embodiment of the image processing apparatus is formed by any of the image processing apparatuses 1. Moreover, this embodiment of the computer-readable storage medium stores a computer program for causing a computer to carry out the processes of the image processing apparatus 1.

Figure 10:
FIG. 10 is a diagram for illustrating an image compressed code stored in a server computer.

In this embodiment, the dynamic image data stored in the server computer S is the image compressed code that is generated according to the Motion JPEG2000. More particularly, the image compressed code is generated as a single file, which is made up of a file header and a body, as shown in FIG. 10. FIG. 10 is a diagram for illustrating the image compressed code stored in the server computer S. A number of code bits of the entire file of a master image, a number of bit planes, a resolution, a number of tiles, a number of frames and the like are recorded in the file header of the file. A compressed code generated according to the JPEG2000 algorithm is recorded for each frame in the body of the file.

Figure 9:
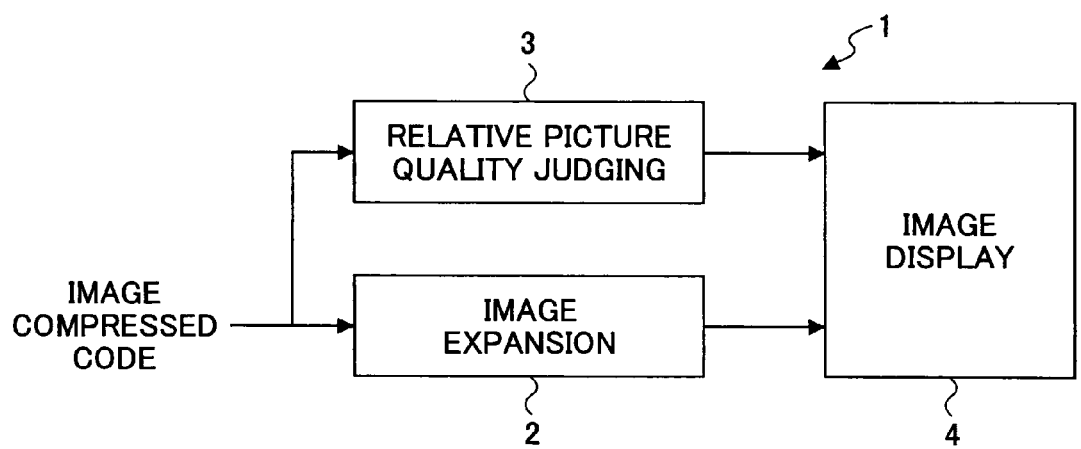
FIG. 9 is a functional block diagram showing a structure of the image processing apparatus.

As shown in FIG. 9, the image processing apparatus 1 includes an image expansion unit 2, a relative picture quality judging unit 3, and an image display unit 4. The image expansion unit 2 functions as an image expansion means (or image expansion unit) for expanding (decoding) the image compressed code (Motion JPEG2000 data) that is input to the image processing apparatus 1 via the network 5. The relative picture quality judging unit 3 functions as a picture quality judging means (or picture quality judging unit) for relatively judging a picture quality of the image data after the expansion based on the image compressed code (Motion JPEG2000 data), as will be described later in more detail. The image display unit 4 functions as an image display means for displaying the image of the image data after the expansion carried out in the image expansion unit 2, and a picture quality information display means (or picture quality information display unit) for displaying a numerical value of the picture quality judged by the relative picture quality judging unit 3. The image display unit 4 displays the image and the numerical value of the picture quality on a display unit 15 shown in FIG. 11, which will be described later.

Figure 11:
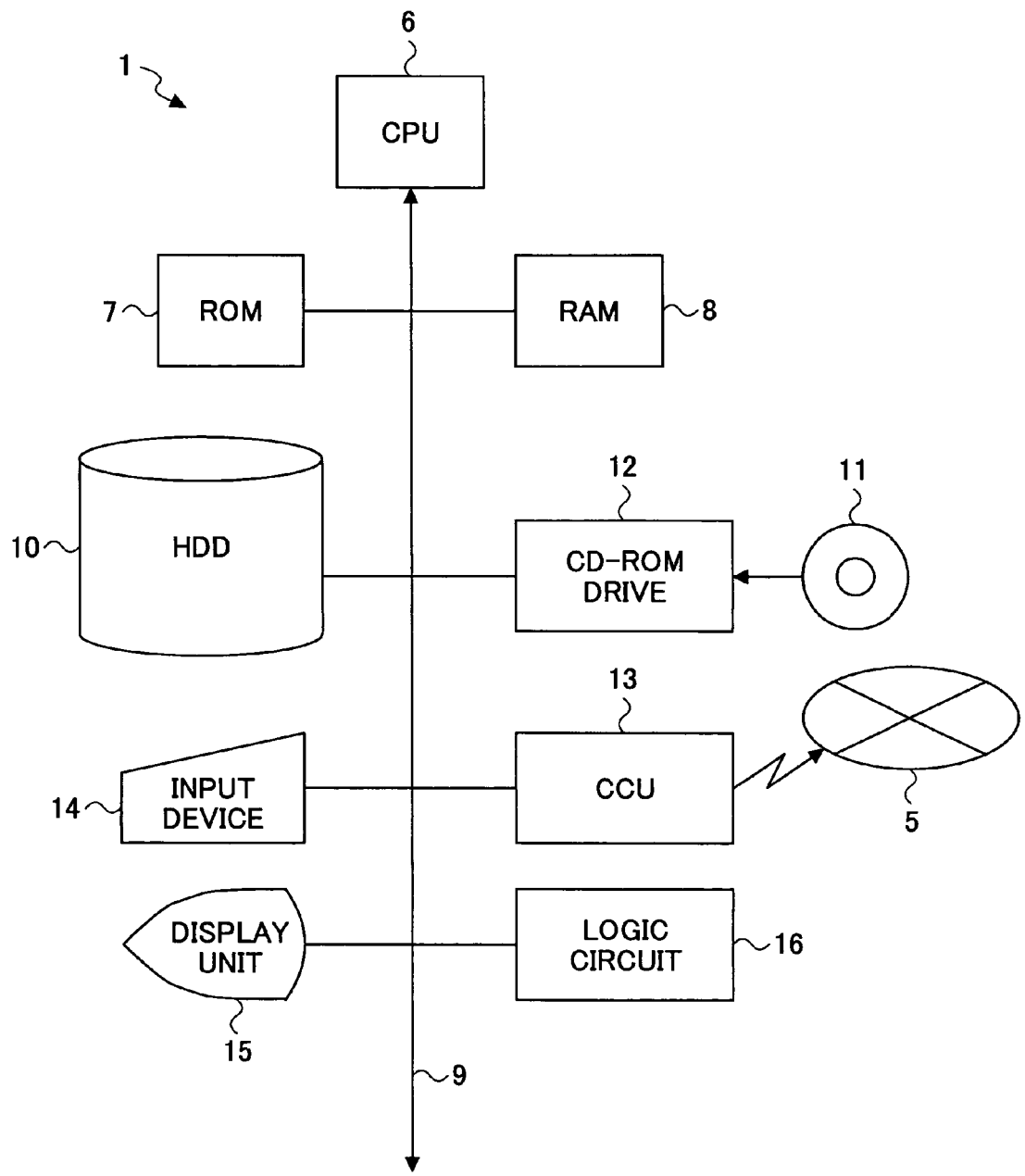
FIG. 11 is a system block diagram showing a hardware structure of an embodiment of an image processing apparatus according to the present invention.

FIG. 11 is a system block diagram showing a hardware structure of the image processing apparatus 1. For example, the image processing apparatus 1 may be formed by a personal computer. As shown in FIG. 11, the image processing apparatus 1 includes a central process unit (CPU) 6, a read only memory (ROM) 7, a random access memory (RAM) 8, a hard disk drive (HDD) 10, a CD-ROM drive 12, a communication control unit (CCU) 13, an input device 14, a display unit 15, and a logic circuit 16 which are connected via a bus 9.

The CPU 6 centrally controls various parts of the image processing apparatus 1. Because the RAM 8 can rewritably store various data, the RAM 8 functions as a work area for the CPU 6, to act as an input buffer or the like for example.

The HDD 10 stores the image compressed code shown in FIG. 10, which is downloaded from the server computer S via the network 5. The CD-ROM drive 12 reads a distributed computer program or computer software from a CD-ROM 11. The CCU 13 controls communication of the image processing apparatus 1 with another computer or the like via the network 5. The input device 14 includes a keyboard, a mouse or the like used by the user (operator) to input various commands and information to the image processing apparatus 1. The display unit 15 includes a cathode ray tube (CRT), a liquid crystal display (LCD) or the like for displaying progress, results and the like of processes to the user (operator). The logic circuit 16 may be formed by an ASIC or a FPGA, created exclusively for carrying out various functions. Alternatively, the logic circuit 16 may be formed by a DSP that operates according to an exclusive program to carry out the various functions. A bus controller (not shown) may be provided for controlling arbitration of the bus 9.

In this embodiment, the CD-ROM 11 forms an embodiment of the computer-readable storage medium according to the present invention, which stores a computer program for causing a computer, such as the personal computer, to carry out the functions of the image processing apparatus 1. The CD-ROM 11 stores an operating system (OS) and various kinds of computer programs or computer software. The CPU 6 reads the computer program stored in the CD-ROM 11 by the CD-ROM drive 12, and installs the read computer program in the HDD 10.

The recording medium forming an embodiment of the computer-readable storage medium is not limited to the CD-ROM 11, and it is possible to use any recording media capable of storing a computer program in a computer-readable manner. For example, various optical recording media typified by optical disks such as a digital versatile disk (DVD), various magneto-optical recording media typified by magneto-optical disks, various magnetic recording media typified by magnetic disks such as a flexible disk, and various semiconductor memory devices may be used to form the computer-readable storage medium.

The computer program may be downloaded to the image processing apparatus 1 from another computer or the like via the network 5 (such as the Internet) and the CCU 13, and installed in the HDD 10. In this case, a storage unit that stores the computer program at the transmitting end computer forms an embodiment of the computer-readable storage medium.

The computer program stored in the computer-readable storage medium may operate on a predetermined operating system (OS). In this case, a portion of the various processes described hereunder may be carried out by the predetermined operating system. Alternatively, the computer program stored in the computer-readable storage medium may be included in a group of program files forming a predetermined application program or operating system, as a portion of the group of program files.

In this embodiment, the HDD 10 of the image processing apparatus 1 having the structure described above at least stores an image processing program for processing images. In other words, this image processing program is stored in the computer-readable storage medium according to the present invention. The CPU 6 carries out processes based on the image processing program, so as to realize the various functions of the image processing apparatus 1. If there are demands to realize real-time processing, it is necessary to carry out the processes at a high speed. In this case, it is desirable to realize the various functions of each part of the image processing apparatus 1 by the operation of the logic circuit 16 which may be formed by the ASIC, FPGA or DSP as described above.

Next, a general description will be given of the operation of each part of the image processing apparatus 1, by referring to FIG. 9. The image compressed code (Motion JPEG2000 data) which is input to the image processing apparatus 1 via the network 5 is subjected to an expansion process in the image expansion unit 2 shown in FIG. 9. The expanded image data output from the image expansion unit 2 is input to the image display unit 4, which displays the image of the expanded image data on the display unit 15. The image compressed code (Motion JPEG2000 data) which is input to the image processing apparatus 1 via the network 5 is also input to the relative picture quality judging unit 3. The relative picture quality judging unit 3 relatively judges the picture quality of the image data after the expansion process carried out in the image expansion unit 2, based on the image compressed code (Motion JPEG2000 data). The picture quality judged by the relative picture quality judging unit 3 is input to the image display unit 4 which displays the numerical value of the picture quality of the image compressed code (Motion JPEG2000 data) on the display unit 15.

The image expansion unit 2 may be realized by a standard unit that expands the image compressed code that has been compressed in conformance with the Motion JPEG2000. Accordingly, a detailed description of the image expansion unit 2 will be omitted.

Figure 12:
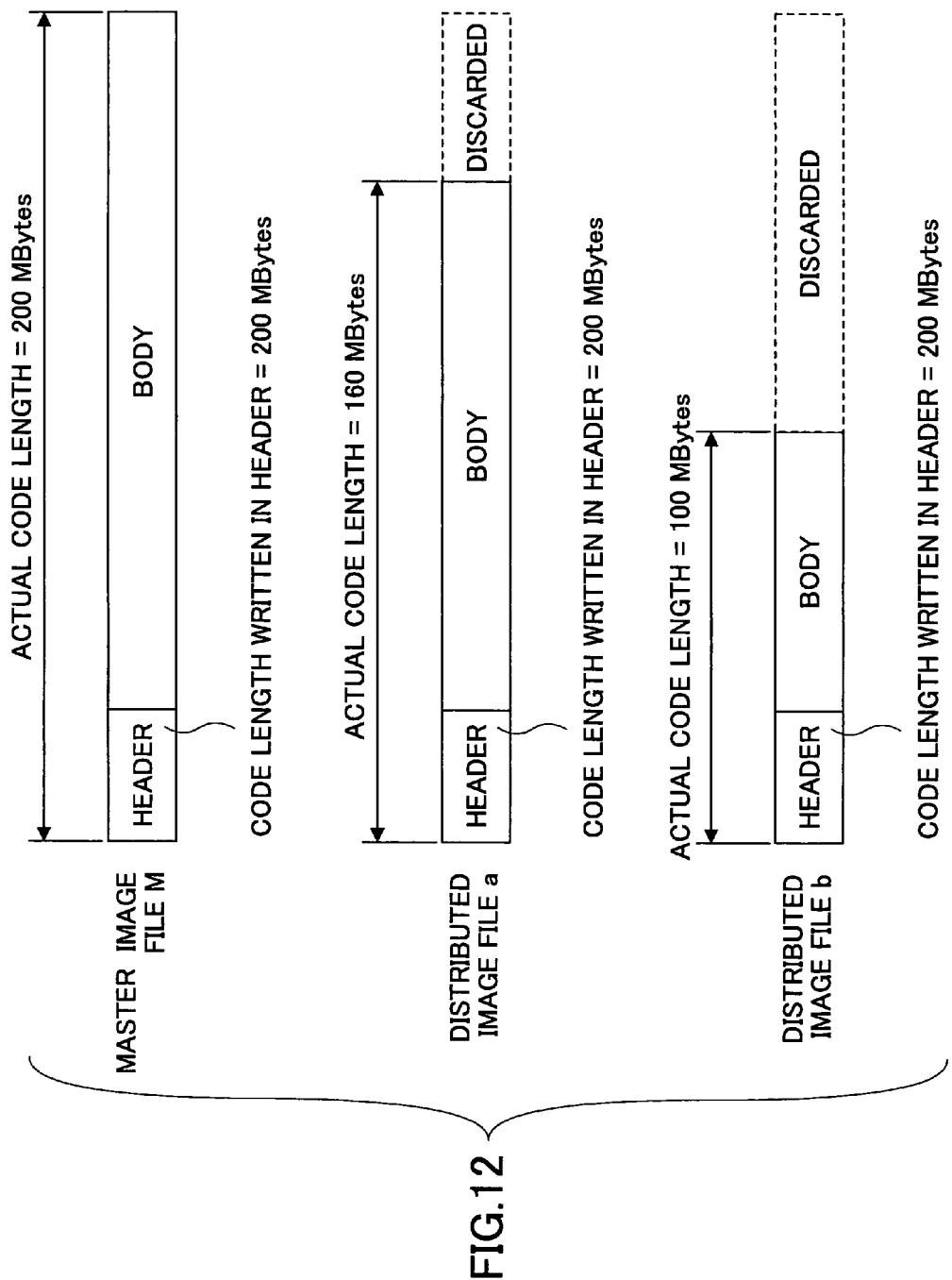
FIG. 12 is a diagram for illustrating an image compressed code (Motion JPEG2000 data) that is input to the image processing apparatus.

Next, a description will be given of the relative picture quality judging unit 3, which forms an important part of this embodiment. In this embodiment, it is assumed for the sake of convenience that the server computer S outputs (distributes) the image compressed code (Motion JPEG2000 data) with respect to the image processing apparatus 1. The image compressed code (Motion JPEG2000 data) which is output (distributed) from the server computer S to the image processing apparatus 1 is an irreversible code file (post quantized file) which is obtained by subjecting a reversible code file (master image file) which is generated according to the Motion JPEG2000 algorithm to a bit truncation (discarding of the code). More particularly, a code length of code information of a master image file "M" is 200 MBytes as shown in FIG. 12, but a code length of code information of a distributed image file "a" and a code length of code information of a distributed image file "b" which are output (distributed) from the server computer S to the image processing apparatus 1 are 160 MBytes and 100 MBytes, respectively. FIG. 12 is a diagram for illustrating the image compressed code (Motion JPEG2000 data) that is input to the image processing apparatus 1. As described above, the number of code bits of the code information of the entire master image file "M," namely, 200 MBytes, is written in the file header of each of the distributed image files "a" and "b" which have been subjected to the post quantization.

Figure 13:
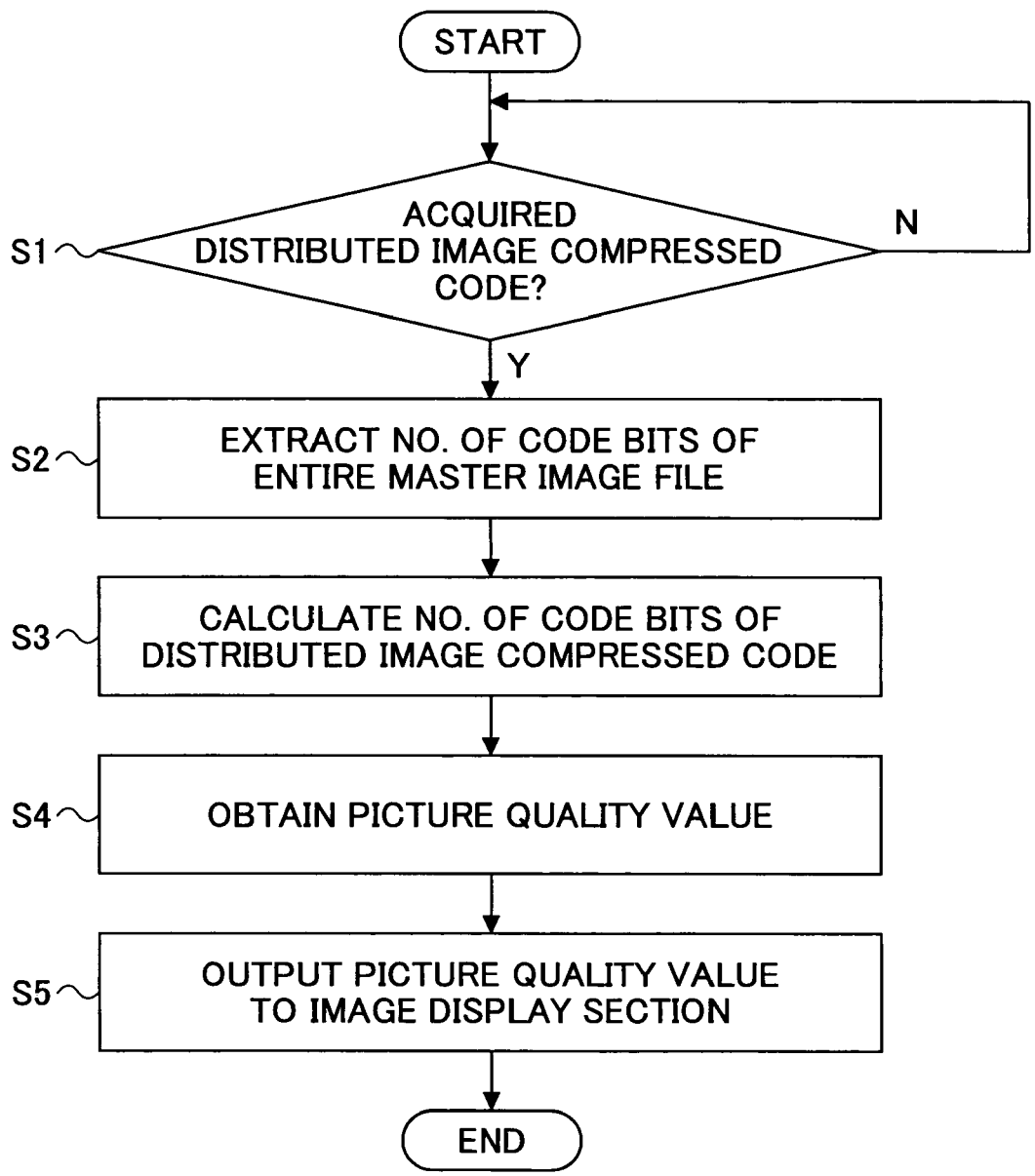
FIG. 13 is a flow chart for illustrating a relative picture quality judging process of a relative picture quality judging unit that relatively judges a picture quality of an image data after expansion.

FIG. 13 is a flow chart for illustrating a relative picture quality judging process of the relative picture quality judging unit 3, which relatively judges the picture quality of the image data after the expansion. As shown in FIG. 13, a step S1 decides whether or not the image compressed code (Motion JPEG2000 data) distributed from the server computer S is acquired. When the decision result in the step S1 becomes YES, a step S2 extracts the number of code bits of the entire master image file "M" which is written in the file header of the image compressed code (Motion JPEG2000 data). For example, in a case where the image compressed code (Motion JPEG2000 data) distributed from the server computer S is the distributed image file "a" or "b," the number of code bits of the entire master image file "M" extracted by the step S2 is 200 MBytes. Hence, the step S2 carries out the functions of a master code information acquiring means (or master code information acquiring unit) for acquiring the master code information.

A step S3 calculates the number of code bits of the image compressed code (Motion MPEG2000 data) distributed from the server computer S. For example, in a case where the image compressed code (Motion JPEG2000 data) distributed from the server computer S is the distributed image file "a" or "b," the number of code bits of the distributed image file "a" or "b" by the step S3 is 160 MBytes or 100 MBytes. Hence, the step S3 carries out the functions of a code information acquiring means (or code information acquiring unit).

A step S4 obtains a picture quality value of the image data after the expansion (expanded image data) by relatively judging the picture quality based on the number of code bits of the entire master image file "M" extracted by the step S2 and the number of code bits of the distributed image compressed code (Motion JPEG2000 data) distributed from the server computer S and calculated by the step S3. For example, the picture quality value of the expanded image data is obtained by substituting into a predetermined function a ratio of the number of code bits of the entire master image file "M" extracted by the step S2 and the number of code bits of the distributed image compressed code (Motion JPEG2000 data) distributed from the server computer S and calculated by the step S3.

Figure 14:
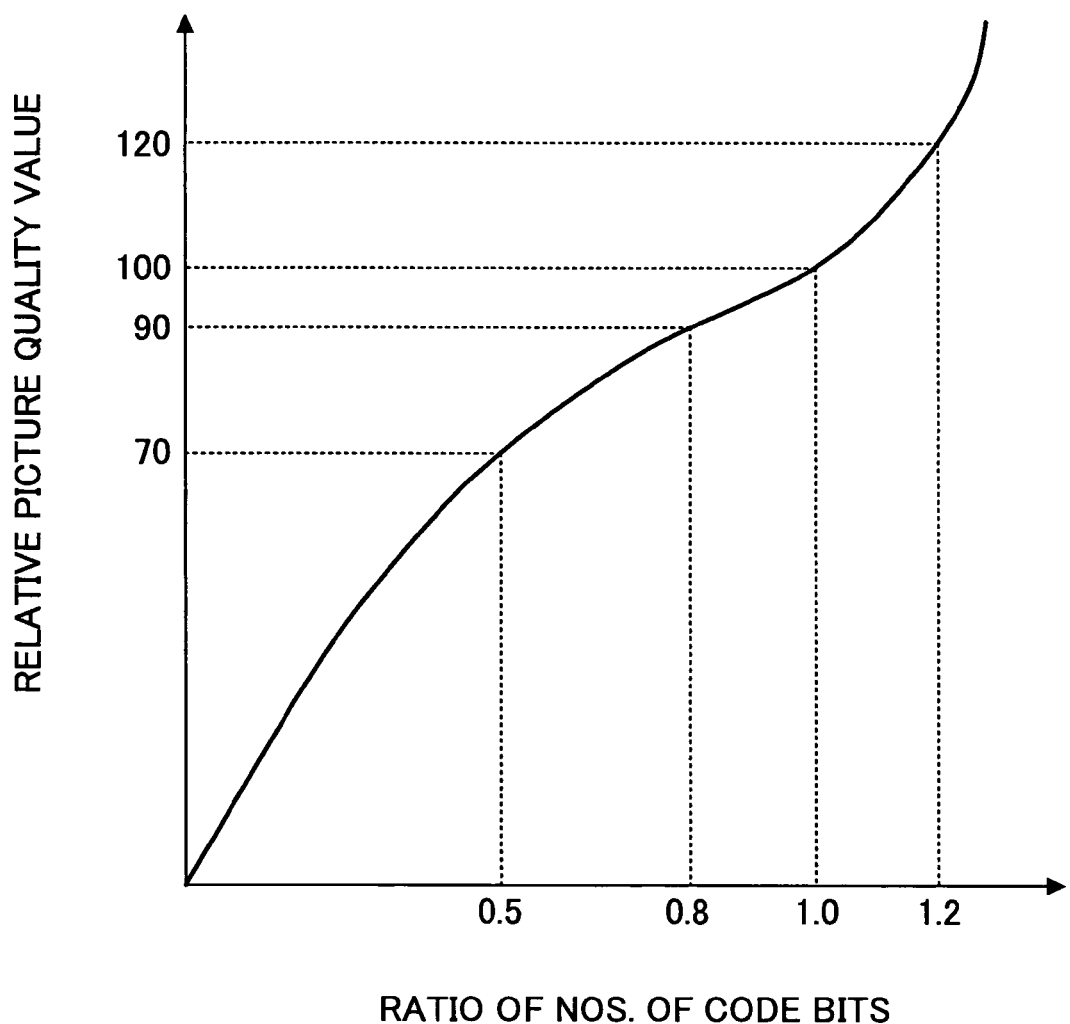
FIG. 14 is a graph showing an embodiment of a predetermined function that is used to calculate a picture quality value.

FIG. 14 is a graph showing an embodiment of the predetermined function that is used to calculate the picture quality value. In FIG. 14, the ordinate indicates the relative picture quality value, and the abscissa indicates the ratio of the numbers of code bits (hereinafter simply referred to as a code bit ratio). Since the number of code bits of the distributed image file "a" is 160 MBytes, the code bit ratio with respect to the number of code bits of the entire master image file "M" which is 200 MBytes, is 0.8. Accordingly, the relative picture quality value of the distributed image file "a." In this case is 90, as shown in FIG. 14. In addition, because the number of code bits of the distributed image file "b" is 100 MBytes, the code bit ratio with respect to the number of code bits of the entire master image file "M" which is 200 MBytes, is 0.5. Accordingly, the relative picture quality value of the distributed image file "b" In this case is 70, as shown in FIG. 14.

A step S5 outputs the picture quality value that is obtained in this manner to the image display unit 4. As a result, the relative picture quality of the distributed image file "a" or "b" is displayed on the display unit 15.

The steps S4 and S5 carry out the functions of a picture quality information output means (or picture quality information output unit).

The relative picture quality value of the distributed image is displayed every time the distributed image is displayed. The relative picture quality value of the distributed image may be combined or composited with the distributed image and displayed therewith. Alternatively, the relative picture quality value of the distributed image may be displayed on a display unit that is other than the display unit 15, which displays the distributed image.

Therefore, the picture quality of the expanded image data which is obtained by expanding the image compressed code, with respect to the picture quality of the master image data, is relatively judged and output as (relative) picture quality information which indicates the picture quality of the expanded image data to be displayed on the display unit 15. For this reason, it is possible to easily and subjectively see the relative picture quality of the expanded image (of the expanded image compressed code) with respect to the master image.

Furthermore, it is possible to obtain the picture quality information that indicates the picture quality of the expanded image data, that is, the relative picture quality value of the distributed image, solely from the image compressed code.

In the embodiment described above, it is assumed for the sake of convenience that the picture quality of each of the distributed image files "a" and "b" is lower than the picture quality of the master image file "M." However, the relationship of the picture qualities of the distributed image files "a" and "b" and the master image file "M" is not limited to that of the above described embodiment. For example, the present invention is similarly applicable to a case where an image that is to be distributed is obtained by subjecting the master image to a high-definition conversion process that converts the definition of the master image into a high definition.

Figure 15:
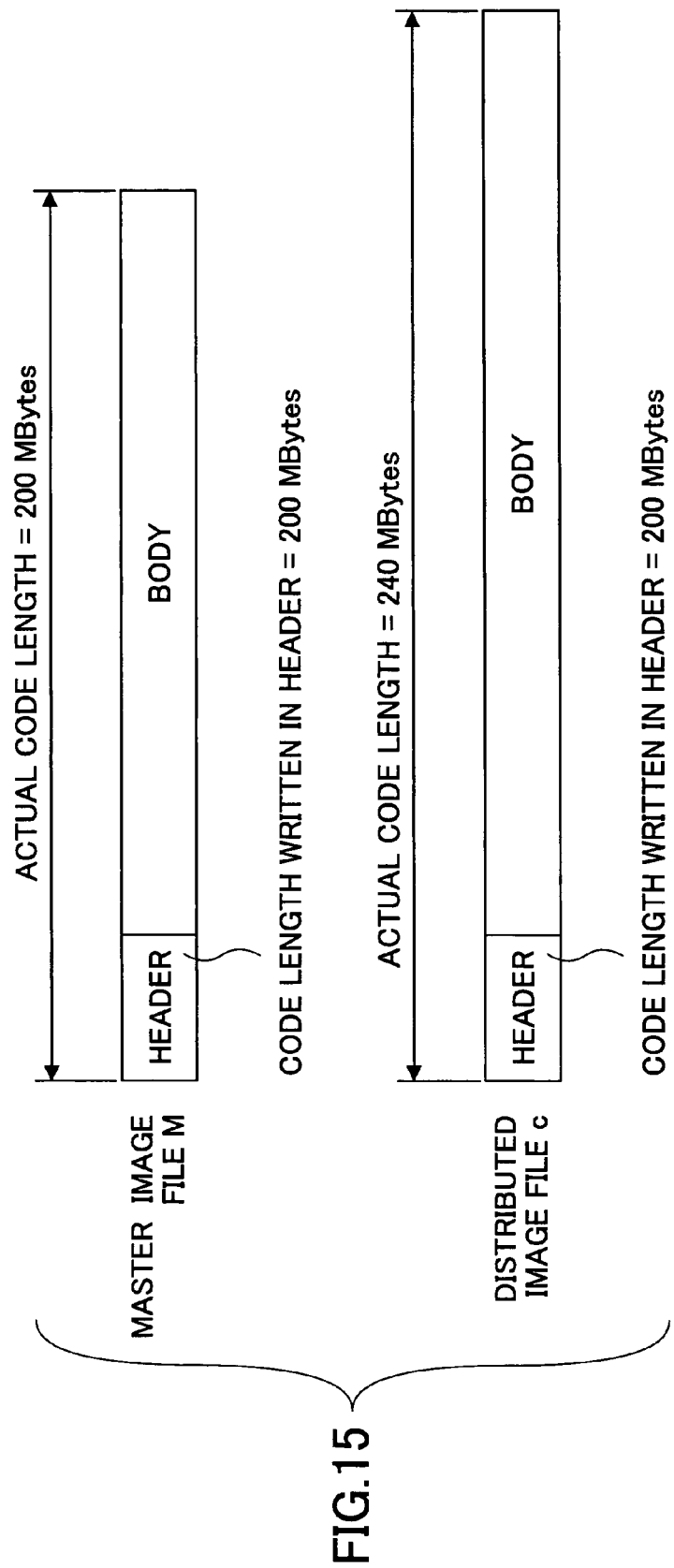
FIG. 15 is a diagram for illustrating another image compressed code (Motion JPEG2000 data) that is input to the image processing apparatus.

FIG. 15 is a diagram for illustrating another image-compressed code (Motion JPEG2000 data) that is input to the image processing apparatus 1. In this case, the number of code bits of the entire master image file "M" is 200 MBytes, and a code length of a distributed image file "c" which is distributed from the server computer S to the image processing apparatus 1 is 240 MBytes. Hence, the code bit ratio is 1.2, and the relative picture quality value of the distributed image file "c" is 120, as shown in FIG. 15.

Hence, in the image processing apparatus, the picture quality judging means uses a number of code bits of the master image data as the code information included in the image compressed code, the master code information acquiring means acquires the number of code bits of the master image data as the code information of the master image data, and the code information acquiring means acquires a number of code bits of the image compressed code as the code information of the image compressed code.

In this embodiment, the number of code bits is used as the code information, and the relative picture quality value of the distributed image is obtained based on the number of code bits of the entire master image file and the number of code bits of the image compressed code (Motion JPEG2000 data) distributed from the server computer S. However, the code information and the relative picture quality value of the distributed image may be obtained by other means. For example, the file header of the image compressed code (Motion JPEG2000 data) distributed from the server computer S includes the number of bit planes, the resolution, the number of tiles, the number of frame and the like, in addition to the number of code bits of the entire master image file. Hence, it is possible to calculate a ratio of any one of the numbers of bit planes, the resolutions, the numbers of tiles and the numbers of frames, between the entire master image file and the image compressed code (Motion JPEG2000 data) which is distributed from the server computer S, so as to obtain the relative picture quality value of the distributed image by substituting the calculated ratio into a predetermined function.

More particularly, the post quantization obtains a predetermined compression ratio by deleting the bit plane (or sub-bit plane). Thus, if the distributed image has been generated by deleting the bit plane of the master image indicated by halftone dot meshing in FIG. 16, it is possible to obtain the relative picture quality value of the distributed image with respect to the master image, based on the number of bit planes which is used as the code information. FIG. 16 is a diagram for illustrating a method of obtaining the relative picture quality value of the distributed image with respect to the master image based on the number of bit planes.

In this case, in the image processing apparatus, the image compressed code is obtained by encoding frequency conversion coefficients of the master image data in units of bit planes, the picture quality judging means uses a number of bit planes of the master image data as the code information included in the image compressed code, the master code information acquiring means acquires the number of bit planes of the master image data as the code information of the master image data, and the code information acquiring means acquires a number of bit planes of the image compressed code as the code information of the image compressed data.

According to the JPEG2000, the resolution is variable by freely stopping the compression and expansion of the still image at an arbitrary hierarchical level (decomposition level) corresponding to the octave division of the block-based DWT. For this reason, in a case where the distributed image has been generated by reducing the resolution of the master image as shown in FIG. 17, it is possible to obtain the relative picture quality value of the distributed image with respect to the master image, based on the resolution which is used as the code information. FIG. 17 is a diagram for illustrating a method of obtaining the relative picture quality value of the distributed image with respect to the master image based on the resolution.

In this case, in the image processing apparatus, the image compressed code is obtained by encoding multiple resolution conversion coefficients of the master image data in units of resolutions, the picture quality judging means uses a resolution of the master image data as the code information included in the image compressed code, the master code information acquiring means acquires the resolution of the master image data as the code information of the master image data, and the code information acquiring means acquires a resolution of the image compressed code as the code information of the image compressed data.

Moreover, according to the JPEG2000, it is possible to independently carry out the compression and expansion of the image data for each tile. Consequently, in a case where the distributed image has been generated by using a portion of the master image as shown in FIG. 18, it is possible to obtain the relative picture quality value of the distributed image with respect to the master image, based on the number of tiles which is used as the code information. FIG. 18 is a diagram for illustrating a method of obtaining the relative picture quality value of the distributed image with respect to the master image based on the number of tiles.

In this case, in the image processing apparatus, the image compressed code is obtained by dividing the master image data into a plurality of rectangular regions (tiles) and encoding the master image data in units of rectangular regions (tiles), the picture quality judging means uses a number of rectangular regions of the master image data as the code information included in the image compressed code, the master code information acquiring means acquires the number of rectangular regions of the master image data as the code information of the master image data, and the code information acquiring means acquires a number of rectangular regions of the image compressed code as the code information of the image compressed data.

Figure 19:
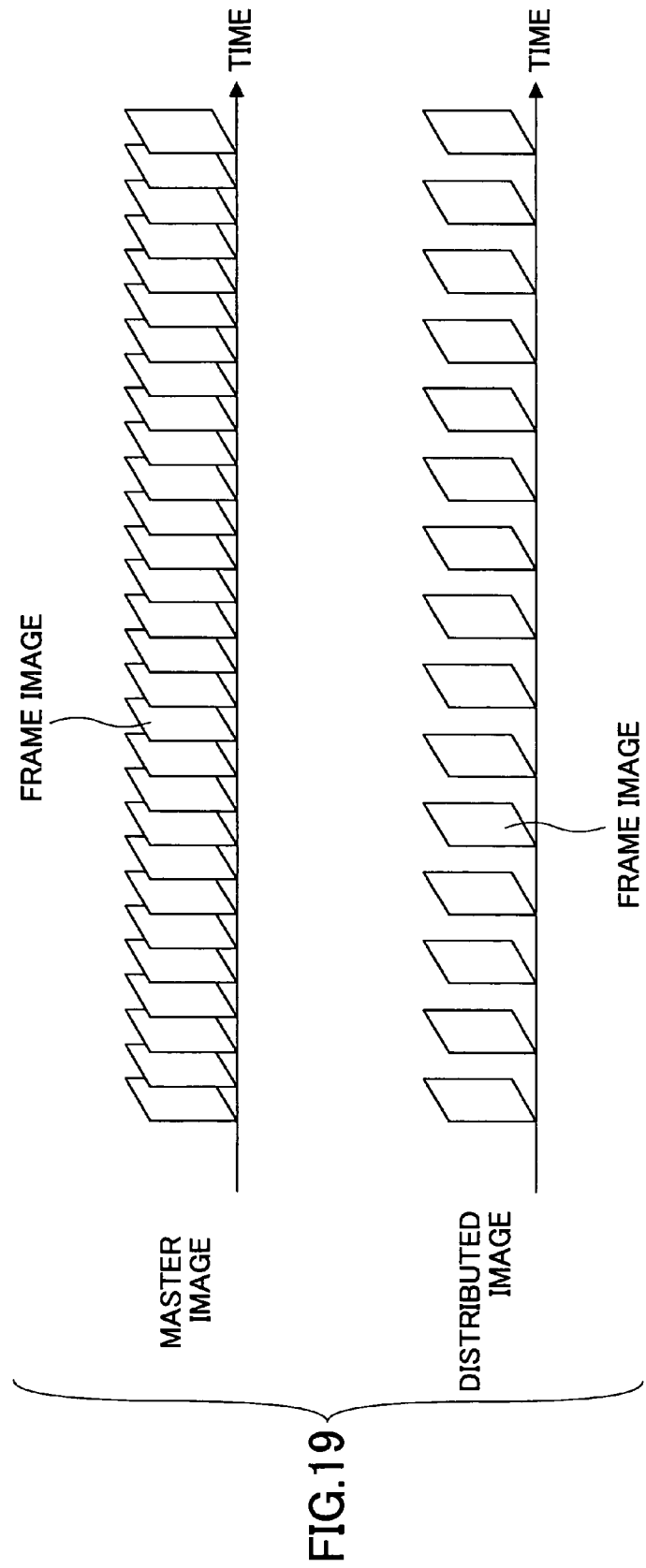
FIG. 19 is a diagram for illustrating a method of obtaining the relative picture quality value of the distributed image with respect to the master image based on a number of frames.

Further, according to the Motion JPEG2000, the JPEG2000 image is consecutively displayed at a predetermined frame rate (number of frames reproduced per unit time). Hence, in a case where the distributed image has been generated by decimating a portion of a frame image forming the master image as shown in FIG. 19, it is possible to obtain the relative picture quality value of the distributed image with respect to the master image, based on the number of frames which is used as the code information. FIG. 19 is a diagram for illustrating a method of obtaining the relative picture quality value of the distributed image with respect to the master image based on the number of frames.

In this case, in the image processing apparatus, the image compressed code is obtained by encoding the master image data, formed by dynamic image data, in units of frames, the picture quality judging means uses a number of frames of the master image data as the code information included in the image compressed code, the master code information acquiring means acquires the number of frames of the master image data as the code information of the master image data, and the code information acquiring means acquires a number of frames of the image compressed code as the code information of the image compressed data.

Next, a description will be given of another embodiment of the image processing method according to the present invention, by referring to FIG. 20. One embodiment of the image processing method is also applied to the system shown in FIG. 8 having the image processing apparatus 1 shown in FIGS. 9 and 11. One embodiment of the image processing method employs an embodiment of the image processing apparatus according to the present invention, which is the image processing apparatus 1, and an embodiment of the computer-readable storage medium according to the present invention, which is a CD-ROM 11, for example.

In the embodiment described above, the relative picture quality value of the distributed image is obtained based on the number of tiles of the entire master image file and the number of tiles of the image compressed code (Motion JPEG2000 data), which is distributed from the server computer S. But one embodiment is characterized by a calculation method that is used to calculate the number of tiles of the image compressed code (Motion JPEG2000 data) that is distributed from the server computer S.

Figure 20:
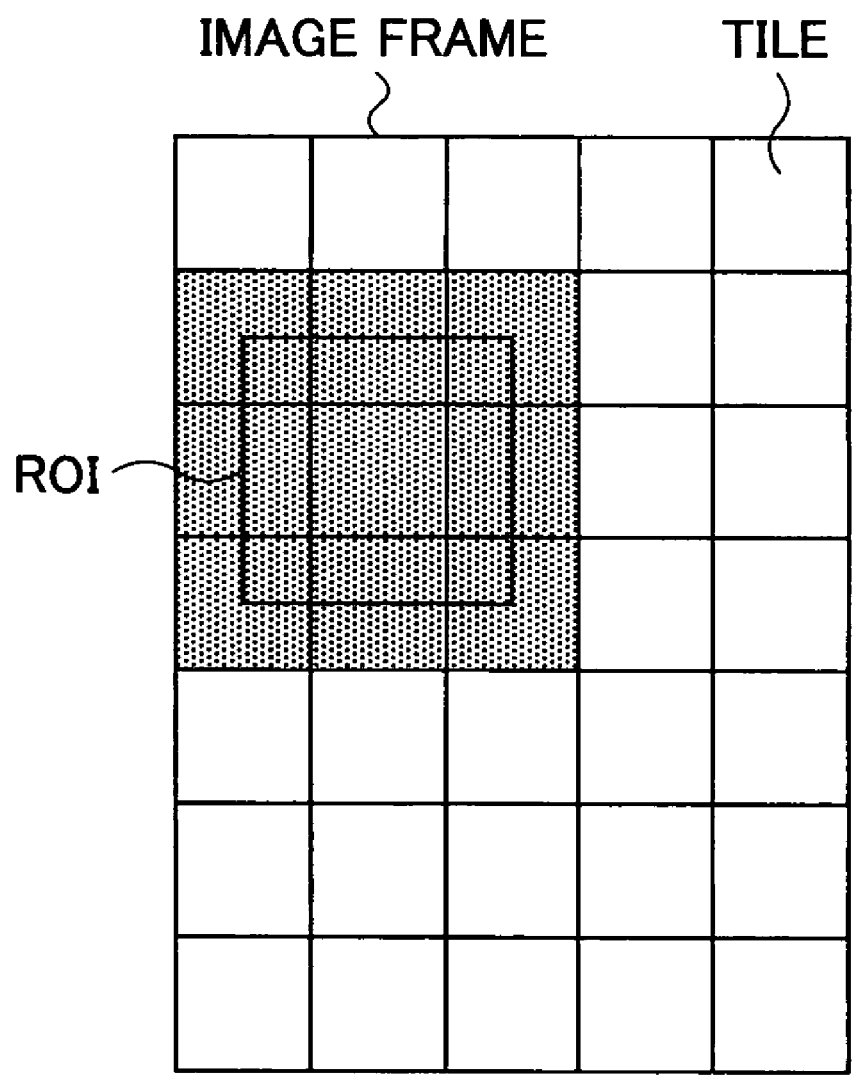
FIG. 20 is a diagram for illustrating an image compressed code (Motion JPEG2000 data) that is distributed from a server computer in another embodiment of the image processing method according to the present invention.

FIG. 20 is a diagram for illustrating the image compressed code (Motion JPEG2000 data) that is distributed from the server computer S in this an embodiment of the image processing method. In one embodiment, it is assumed for the sake of convenience that the image frame is divided into five tiles in the horizontal direction and seven tiles in the vertical direction as shown in FIG. 20. Of the image compressed code (Motion JPEG2000 data) shown in FIG. 20, only the tiles including a Region Of Interest (ROI) are distributed from the server computer S as the image compressed code (Motion JPEG2000 data). The ROI is a portion of the entire image, which is extracted from the entire image and enlarged, emphasized compared to other portions or subjected to other processes. The ROI is often used to improve the relative picture quality thereof compared to other portions of the entire image. The ROI itself is known, and a description of the ROI will be omitted.

According to the embodiment described above, a ratio (9/35□0.26) is calculated based on the number of tiles (5×7=35 in FIG. 20) of the entire master image file and the number of tiles (3×3=9 in FIG. 20) of the image compressed code (Motion JPEG2000 data) which is distributed from the server computer S. This ratio is substituted into the predetermined function to obtain the relative picture quality value of the distributed image (distributed image file). However, since the ROI is used when extracting a portion of the entire image and subjecting this portion to enlargement, emphasis compared to other portions or other processes, this embodiment carries out a weighting with respect to the tiles including the ROI.

In other words, in a case where only the tiles including the ROI within the image frame form the distributed image which is distributed from the server computer S, the ratio of the number of tiles becomes as follows when a weighting of 1.5 times is carried out with respect to the tiles including the ROI.

$$(1.5\times9)/(1.5\times9+1.0\times26)\approx0.34$$

By carrying out the weighting with respect to the tiles corresponding to the ROI or the like having the relative picture quality which is improved compared to other portions of the entire image, it becomes possible to more accurately obtain the picture quality information which indicates the picture quality of the expanded image data (relative picture quality value of the distributed image).

Further, the present invention is not limited to these embodiments, but various variations and modifications may be made without departing from the scope of the present invention.

What is claimed is:

1. An image processing apparatus connectable via a network to a storage to store an image compressed code of a dynamic image data, comprising:
    an image expansion unit to expand the image compressed code and to output an expanded image data;
    a first acquiring unit to acquire information of a master image data stored in a file header of the image compressed code of the dynamic image data stored in the storage;
    a second acquiring unit to acquire information of the image compressed code of the dynamic image data stored in the storage;
    a judging unit to judge a picture quality of the expanded image data output from the image expansion unit, the picture quality to be calculated by substituting, into a non-linear function, a ratio of a number of code bits of an entire file of the master image data and a number of code bits of the dynamic image data, and to generate picture quality information, based on the information of the master image data acquired by the first acquiring unit and the information of the image compressed code acquired by the second acquiring unit; and
    an image display unit to display, on a display unit, an image of the expanded image data output from the image expansion unit and the picture quality information generated by the judging unit, wherein the information of the master image data stored in the file header of the image compressed code is the number of code bits of the entire file of the master image data, and the information of the image compressed code of the dynamic image data is the number of code bits of the dynamic image data.

2. An image processing apparatus connectable via a network to a storage to store an image compressed code of a dynamic image data, comprising:
    an image expansion unit to expand the image compressed code and to output an expanded image data;
    a first acquiring unit to acquire information of a master image data stored in a file header of the image compressed code of the dynamic image data stored in the storage;
    a second acquiring unit to acquire information of the image compressed code of the dynamic image data stored in the storage;
    a judging unit to judge a picture quality of the expanded image data output from the image expansion unit and to generate picture quality information, based on the information of the master image data acquired by the first acquiring unit and the information of the image compressed code acquired by the second acquiring unit, the picture quality to be calculated by substituting, into a non-linear function, a ratio of a number of bit planes of an entire file of the master image data and a number of bit planes of the dynamic image data; and
    an image display unit to display, on a display unit, an image of the expanded image data output from the image expansion unit and the picture quality information generated by the judging unit, wherein the information of the master image data stored in the file header of the image compressed code is the number of bit planes of the entire file of the master image data, and the information of the image compressed code of the dynamic image data is the number of bit planes of the dynamic image data.

3. The image processing apparatus of claim 2, wherein the image compressed code is obtained by encoding frequency conversion coefficients of the master image data in units of bit planes.

4. An image processing apparatus connectable via a network to a storage to store an image compressed code of a dynamic image data, comprising:
    an image expansion unit to expand the image compressed code and to output an expanded image data;
    a first acquiring unit to acquire information of a master image data stored in a file header of the image compressed code of the dynamic image data stored in the storage;
    a second acquiring unit to acquire information of the image compressed code of the dynamic image data stored in the storage;
    a judging unit to judge a picture quality of the expanded image data output from the image expansion unit and to generate picture quality information, based on the information of the master image data acquired by the first acquiring unit and the information of the image compressed code acquired by the second acquiring unit, the picture quality to be calculated by substituting, into a non-linear function, a ratio of a resolution of an entire file of the master image data and a resolution of the dynamic image data; and
    an image display unit to display, on a display unit, an image of the expanded image data output from the image expansion unit and the picture quality information generated by the judging unit, wherein the information of the master image data stored in the file header of the image compressed code is the resolution of the entire file of the master image data, and the information of the image compressed code of the dynamic image data is the resolution of the dynamic image data.

5. An image processing apparatus connectable via a network to a storage to store an image compressed code of a dynamic image data, comprising:
    an image expansion unit to expand the image compressed code and to output an expanded image data;
    a first acquiring unit to acquire information of a master image data stored in a file header of the image compressed code of the dynamic image data stored in the storage;
    a second acquiring unit to acquire information of the image compressed code of the dynamic image data stored in the storage;

a judging unit to judge a picture quality of the expanded image data output from the image expansion unit and to generate picture quality information, based on the information of the master image data acquired by the first acquiring unit and the information of the image compressed code acquired by the second acquiring unit, the picture quality to be calculated by substituting, into a non-linear function, a ratio of a number of rectangular regions of an entire file of the master image data and a number of rectangular regions of the dynamic image data; and an image display unit to display, on a display unit, an image of the expanded image data output from the image expansion unit and the picture quality information generated by the judging unit, wherein the information of the master image data stored in the file header of the image compressed code is the number of rectangular regions of the entire file of the master image data, and the information of the image compressed code of the dynamic image data is the number of rectangular regions of the dynamic image data.

6. The image processing apparatus of claim 5, wherein the image compressed code is obtained by dividing the master image data into a plurality of rectangular regions and encoding the master image data in units of rectangular regions.

7. The image processing apparatus of claim 6, wherein predetermined rectangular regions have been subjected to a weighting of the number of rectangular regions of the image compressed data.

8. An image processing apparatus connectable via a network to a storage to store an image compressed code of a dynamic image data, comprising:

an image expansion unit to expand the image compressed code and to output an expanded image data;

a first acquiring unit to acquire information of a master image data stored in a file header of the image compressed code of the dynamic image data stored in the storage;

a second acquiring unit to acquire information of the image compressed code of the dynamic image data stored in the storage;

a judging unit to judge a picture quality of the expanded image data output from the image expansion unit and to generate picture quality information, based on the information of the master image data acquired by the first acquiring unit and the information of the image compressed code acquired by the second acquiring unit, the picture quality to be calculated by substituting, into a non-linear function, a ratio of a number of frames of an entire file of the master image data and a number of frames of the dynamic image data; and an image display unit to display, on a display unit, an image of the expanded image data output from the image expansion unit and the picture quality information generated by the judging unit, wherein the information of the master image data stored in the file header of the image compressed code is the number of frames of the entire file of the master image data, and the information of the image compressed code of the dynamic image data is the number of frames of the dynamic image data.

9. The image processing apparatus of claim 8, wherein the image compressed code is obtained by encoding the master image data, formed by dynamic image data, in frame units.

10. A computer-readable storage medium that stores a computer program which, when executed by a computer, causes the computer to perform operations comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a ratio of a number of code bits of an entire file of the master image data and a number of code bits of the dynamic image data; and displaying an image of the expanded image data output from the image expansion unit and the picture quality information, wherein the information of the master image data stored in the file header of the image compressed code is the number of code bits of the entire file of the master image data, and the information of the image compressed code of the dynamic image data is the number of code bits of the dynamic image data.

11. A computer-readable storage medium that stores a computer program which, when executed by a computer, causes the computer to perform operations comprising:

expanding an image compressed code and outputting an expanded image data;

acquiring information of a master image data stored in a file header of an image compressed code of a dynamic image data stored in a storage;

acquiring information of the image compressed code of the dynamic image data stored in the storage;

judging a picture quality of the expanded image data output from the image expansion unit and generating picture quality information, based on the information of the master image data and the information of the image compressed code, the picture quality calculated by substituting, into a non-linear function, a ratio of a number of bit planes of an entire file of the master image data and a number of bit planes of the dynamic image data; and displaying an image of the expanded image data output and the picture quality information, wherein the information of the master image data stored in the file header of the image compressed code is the number of bit planes of the entire file of the master image data, and the information of the image compressed code of the dynamic image data is the number of bit planes of the dynamic image data.

12. The computer-readable storage medium of claim 11, wherein the image compressed code is obtained by encoding frequency conversion coefficients of the master image data in units of bit planes.

13. A computer-readable storage medium that stores a computer program which, when executed by a computer, causes the computer to perform operations comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and to generating picture quality information, based on the information of the master image data and the information of the image compressed code, the picture quality calculated by substituting, into a non-linear function, a ratio of a resolution of an entire file of the master image data and a resolution of the dynamic image data; and displaying an image of the expanded image data output and the picture quality information, wherein the information of the master image data stored in the file header of the image compressed code is the resolution of the entire file of the master image data, and the information of the image compressed code of the dynamic image data is the resolution of the dynamic image data.

14. A computer-readable storage medium that stores a computer program which, when executed by a computer, causes the computer to perform operations comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality infonnation, based on the information of the master image data and the information of the image compressed code, the picture quality calculated by substituting, into a non-linear function, a number of rectangular regions of an entire file of the master image data and a number of rectangular regions of the dynamic image data; and displaying an image of the expanded image data output and the picture quality information, wherein the information of the master image data stored in the file header of the image compressed code is the number of rectangular regions of the entire file of the master image data, and the information of the image compressed code of the dynamic image data is the number of rectangular regions of the dynamic image data.

15. The computer-readable storage medium of claim 14, wherein the image compressed code is obtained by dividing the master image data into a plurality of rectangular regions and encoding the master image data in units of rectangular regions.

16. The computer-readable storage medium of claim 15, wherein predetermined rectangular regions have been subjected to a weighting of the number of rectangular regions of the image compressed data.

17. A computer-readable storage medium that stores a computer program which, when executed by a computer, causes the computer to perform operations comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a number of frames of an entire file of the master image data and a number of frames of the dynamic image data; and displaying an image of the expanded image data output and the picture quality information, wherein the information of the master image data stored in the file header of the image compressed code is the number of frames of the entire file of the master image data, and the information of the image compressed code of the dynamic image data is the number of frames of the dynamic image data.

18. The computer-readable storage medium of claim 17, wherein the image compressed code is obtained by encoding the master image data, formed by dynamic image data, in frame units.

19. An image processing method comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a number of code bits of an entire file of the master image data and a number of code bits of the dynamic image data; and displaying an image of the expanded image data output and the picture quality information, wherein the information of the master image data stored in the file header of the image compressed code is the number of code bits of the entire file of the master image data, and the information of the image compressed code of the dynamic image data is the number of code bits of the dynamic image data.

20. An image processing method comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a number of bit planes of an entire file of the master image data and a number of bit planes of the dynamic image data; and displaying an image of the expanded image data output and the picture quality information, wherein the information of the master image data stored in the file header of the image compressed code is the number of bit planes of the entire file of the master image data, and the information of the image compressed code of the dynamic image data is the number of bit planes of the dynamic image data.

21. The image processing method of claim 20, wherein the image compressed code is obtained by encoding frequency conversion coefficients of the master image data in units of bit planes.

22. An image processing method comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a resolution of an entire file of the master image data and a resolution of the dynamic image data; and displaying an image of the expanded image data output and the picture quality information, wherein the information of the master image data stored in the file header of the image compressed code is the resolution of the entire file of the master image data, and the information of the image compressed code of the dynamic image data is the resolution of the dynamic image data.

23. An image processing method comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a number of rectangular regions of an entire file of the master image data and a number of rectangular regions of the dynamic image data; and displaying an image of the expanded image data output and the picture quality information, wherein the information of the master image data stored in the file header of the image compressed code is the number of rectangular regions of the entire file of the master image data, and the information of the image compressed code of the dynamic image data is the number of rectangular regions of the dynamic image data.

24. The image processing method of claim 23, wherein the image compressed code is obtained by dividing the master image data into a plurality of rectangular regions and encoding the master image data in units of rectangular regions.

25. The image processing method of claim 24, wherein predetermined rectangular regions have been subjected to a weighting of the number of rectangular regions of the image compressed data.

26. An image processing method comprising:

expanding an image compressed code and outputting an expanded image data;

acquiring information of a master image data stored in a file header of the image compressed code of a dynamic image data stored in a storage;

acquiring information of the image compressed code of the dynamic image data stored in the storage;

judging a picture quality of the expanded image data output and generating picture quality information, based on the information of the master image data and the information of the image compressed code, the picture quality calculated by substituting, into a non-linear function, a number of frames of an entire file of the master image data and a number of frames of the dynamic image data; and displaying an image of the expanded image data output and the picture quality information, wherein the information of the master image data stored in the file header of the image compressed code is the number of frames of the entire file of the master image data, and the information of the image compressed code of the dynamic image data is the number of frames of the dynamic image data.

27. The image processing method of claim 26, wherein the image compressed code is obtained by encoding the master image data, formed by dynamic image data, in frame units.

* * * * *